US008887210B2

(12) United States Patent
Nakata

(10) Patent No.: US 8,887,210 B2
(45) Date of Patent: Nov. 11, 2014

(54) TRANSMISSION APPARATUS, INFORMATION TRANSMISSION METHOD, RECEPTION APPARATUS, AND INFORMATION PROCESSING METHOD

(75) Inventor: Shingo Nakata, Tokyo (JP)

(73) Assignee: Sony Corporation (JP)

( * ) Notice: Subject to any disclaimer, the term of this patent is extended or adjusted under 35 U.S.C. 154(b) by 1078 days.

(21) Appl. No.: 12/452,338

(22) PCT Filed: Apr. 27, 2009

(86) PCT No.: PCT/JP2009/058283

§ 371 (c)(1), (2), (4) Date: Dec. 23, 2009

(87) PCT Pub. No.: WO2009/133854

PCT Pub. Date: Nov. 5, 2009

(65) Prior Publication Data

US 2010/0138887 A1 Jun. 3, 2010

(30) Foreign Application Priority Data

May 2, 2008 (JP) ................................ P2008-120154

(51) Int. Cl.
*H04N 7/18* (2006.01)
*H04N 7/173* (2011.01)

(Continued)

(52) U.S. Cl.
CPC ..... *H04N 21/4332* (2013.01); *H04N 21/42646* (2013.01); *H04N 21/4325* (2013.01); *H04N 21/4122* (2013.01); *H04N 21/4307* (2013.01)
USPC ............. 725/80; 725/133; 725/141; 348/552; 348/553

(58) Field of Classification Search
CPC .................... H04N 21/4122; H04N 21/42646; H04N 21/4307; H04N 21/4325
USPC ................... 725/147–148, 150–151, 153, 80; 348/552–553, 564, 569, 738
See application file for complete search history.

(56) References Cited

U.S. PATENT DOCUMENTS

2007/0277216 A1 11/2007 Nakajima
2008/0046950 A1 2/2008 Nakajima
2009/0237561 A1 * 9/2009 Kobayashi .................... 348/554

FOREIGN PATENT DOCUMENTS

JP 2006-319503 A 11/2006
JP 2007-311927 A 11/2007

(Continued)

*Primary Examiner* — Hai V Tran

(74) *Attorney, Agent, or Firm* — Lerner, David, Littenberg, Krumholz & Mentlik, LLP

(57) ABSTRACT

On a reception side, display processing and the like is easily performed in synchronization with content data. A cam coder transmits reproduction content data to a television set through a TMDS line of an HDMI cable. The cam coder transmits processing information used to perform the display processing in synchronization with the reproduction content data to the television set through a bidirectional communication path included in the cable before the reproduction content data is transmitted. Index information is added to the processing information for each unit of processing. Index information corresponding to the index information added to the processing information is added to the reproduction content data at a timing when the processing information of each unit of processing is processed. The television set superposes information on a shooting location, a date and time, and the like on an image in accordance with the processing information corresponding to the index information at a timing when the index information is added to the received content data.

12 Claims, 29 Drawing Sheets

(51) Int. Cl.

| | |
|---|---|
| ***H04N 7/16*** | (2011.01) |
| ***H04N 5/44*** | (2011.01) |
| ***H04N 7/00*** | (2011.01) |
| ***H04N 11/00*** | (2006.01) |
| ***H04N 21/426*** | (2011.01) |
| ***H04N 21/432*** | (2011.01) |
| ***H04N 21/41*** | (2011.01) |
| ***H04N 21/433*** | (2011.01) |
| ***H04N 21/43*** | (2011.01) |

(56) References Cited

FOREIGN PATENT DOCUMENTS

| | | | | |
|---|---|---|---|---|
| JP | 2008-048136 | A | | 2/2008 |
| WO | WO 2007049556 | A1 | * | 5/2007 |

* cited by examiner

FIG. 7
PRIOR ART

| PIN | Signal Assignment |
|---|---|
| 1 | TMDS Data2+ |
| 3 | TMDS Data2– |
| 5 | TMDS Data1 Shield |
| 7 | TMDS Data0+ |
| 9 | TMDS Data0– |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1– |
| 8 | TMDS Data0 Shield |
| 10 | TMDS Clock+ |
| 12 | TMDS Clock– |
| 14 | Reserved (N. C. on device) |
| 16 | SDA |
| 18 | +5V Power |

FIG. 9

| Byte# | Field Name | Contents |
|---|---|---|
| n | Vendor Specific InfoFrame Type Code | 0x01 |
| n+1 | Vendor Specific InfoFrame Version | 0x01 |
| n+2 | Lv InfoFrame Length | Total number of bytes in InfoFrame Payload including IEEE Registration ID |
| n+3 | 24bit IEEE Registration Identifier | 24bit IEEE Registration ID (Least Significant Byte first) |
| | | |
| n+5 | | |
| | Vendor Specific Payload | Vendor Specific Payload |
| n+Lv-1 | | |

| Byte/Bit# | 7 | 6 | 5 | 4 | 3 | 2 | 1 | 0 |
|---|---|---|---|---|---|---|---|---|
| HB0 | 0 | 0 | 0 | 0 | 0 | 0 | 1 | 1 |
| HB1 | 0 | 0 | 0 | 0 | 0 | 0 | 0 | 0 |
| HB2 | 0 | 0 | 0 | 0 | 0 | 0 | 0 | 0 |

(b)

| Byte/Bit# | 7 | 6 | 5 | 4 | 3 | 2 | 1 | 0 |
|---|---|---|---|---|---|---|---|---|
| SB0 | 0 | 0 | 0 | Clear_AVMUTE | 0 | 0 | 0 | Set_AVMUTE |
| SB1 | PP3 | PP2 | PP1 | PP0 | CD3 | CD2 | CD1 | CD0 |
| SB2 | 0 | 0 | 0 | 0 | 0 | 0 | 0 | Default_Phase |
| SB3 | 0 | 0 | 0 | 0 | 0 | 0 | 0 | 0 |
| SB4 | 0 | 0 | 0 | 0 | 0 | 0 | 0 | 0 |
| SB5 | 0 | 0 | 0 | 0 | 0 | 0 | 0 | 0 |
| SB6 | 0 | 0 | 0 | 0 | 0 | 0 | 0 | 0 |

| Byte/Bit# | 7 | 6 | 5 | 4 | 3 | 2 | 1 | 0 | |
|---|---|---|---|---|---|---|---|---|---|
| HB0 | 1 | 0 | 0 | 0 | 1 | 0 | 0 | 0 | InfoFrame Type |
| HB1 | 0 | 0 | 0 | 0 | 0 | 0 | 0 | 1 | InfoFrame Version |
| HB2 | 0 | 0 | 0 | 0 | 1 | 1 | 0 | 0 | InfoFrame Length |

(b)

| Byte/Bit# | 7 | 6 | 5 | 4 | 3 | 2 | 1 | 0 | |
|---|---|---|---|---|---|---|---|---|---|
| Data0 | | | | | | | | | Checksum |
| Data1 | | | | | | | | | Data Byte1 |
| Data2 | | | | | | | | | Data Byte2 |
| Data3 | | | | | | | | | Data Byte3 |
| Data27 | | | | | | | | | Data Byte27 |

(a)

| INDEX NUMBER | DISPLAYED CONTENT |
|---|---|
| 1 | DECEMBER 5, ABIKO |
| 2 | JULY 8, NAHA |
| 3 | MARCH 30, SHINAGAWA |

(b)

| INDEX NUMBER | IMAGE |
|---|---|
| 1 | A |
| 2 | B |
| 3 | C |

| Byte/Bit# | 7 | 6 | 5 | 4 | 3 | 2 | 1 | 0 | |
|---|---|---|---|---|---|---|---|---|---|
| Data1 | 1 | 0 | 0 | 0 | 0 | 0 | 0 | 1 | Data Byte1 |
| Data2 | 0 | 0 | 0 | 0 | 0 | 0 | 1 | 0 | Data Byte2 |
| Data3 | | | | | | | | | Data Byte3 |
| | | | | | | | | | |
| Data27 | | | | | | | | | Data Byte27 |

| INDEX NUMBER | PROCESSING INFORMATION |
|---|---|
| 1 | Normal |
| 2 | Audio Mute |

(b)

| INDEX NUMBER | IMAGE |
|---|---|
| 2 | A |
| 1 | B |

| INDEX NUMBER | PROCESSING INFORMATION |
|---|---|
| 1 | Normal |
| 2 | Audio Mute After x Frames |
| 3 | Audio Mute |

(b)

| INDEX NUMBER | IMAGE |
|---|---|
| 3 | A |
| 1 | B |
| 2 | C |

FIG. 28

| Byte/Bit# | 7 | 6 | 5 | 4 | 3 | 2 | 1 | 0 | |
|---|---|---|---|---|---|---|---|---|---|
| Data1 | 1 | 0 | 0 | 0 | 0 | 0 | 0 | 1 | Data Byte1 |
| Data2 | 0 | 0 | 0 | 1 | 0 | 0 | 0 | 0 | Data Byte2 |
| Data3 | | | | | | | | | Data Byte3 |
| Data27 | | | | | | | | | Data Byte27 |

| INDEX NUMBER | PROCESSING INFORMATION |
|---|---|
| 1 | None |
| 2 | Mute |
| 3 | AV Amp active & Dolby 5.1ch REPRODUCTION |

(b)

| INDEX NUMBER | IMAGE |
|---|---|
| 2 | A |
| 3 | B |
| 1 | C |

TRANSMISSION APPARATUS, INFORMATION TRANSMISSION METHOD, RECEPTION APPARATUS, AND INFORMATION PROCESSING METHOD

CROSS-REFERENCES TO RELATED APPLICATIONS

The present application is a national phase entry under 35 U.S.C. §371 of International Application No. PCT/JP2009/058283 filed Apr. 27, 2009, published on Nov. 5, 2009 as WO 2009/133854 A1, which claims priority from Japanese Patent Application No. JP 2008-120154 filed in the Japanese Patent Office on May 2, 2008.

BACKGROUND OF THE INVENTION

1. Technical Field

The present invention relates to transmission apparatuses, information transmission methods, reception apparatuses, and information processing methods. Specifically, the present invention relates to a transmission apparatus or the like easily capable of performing, when transmitting content data using a first transmission path and processing information used for processing performed in synchronization with the content data using a second transmission path, processing in synchronization with the content data on a reception side by adding index information to the processing information for each unit of processing and adding index information to the content data at a timing when the processing using the processing information is performed for each unit of processing.

2. Background Art

In recent years, an HDMI (High Definition Multimedia Interface) has been widely used as a communication interface which is used to transmit digital video signals and digital audio signals which accompany the video signals at high speed from an AV source (Audio Visual source) such as a DVD (Digital Versatile Disc) recorder or a set-top box to a display such as a television receiver or a projector (refer to Patent Document 1, for example).

Patent Document 1: Japanese Unexamined Patent Application Publication No. 2006-319503

SUMMARY OF THE INVENTION

For transmission of image data and audio data using the HDMI, processing information in association with such data may be transmitted through Ethernet (registered trademark). In this case, the image data and the audio data transmitted through the HDMI and the processing information transmitted through Ethernet are not synchronized with each other. Therefore, it is difficult to perform processing using the processing information in synchronization with the image data and the audio data on a reception side.

An object of the present invention is to easily perform processing in synchronization with content data on a reception side.

Technical Solution

The present invention provides a transmission apparatus including a data transmission unit configured to transmit content data through a first transmission path to an external apparatus, and an information transmission unit configured to transmit processing information used to perform processing in synchronization with the content data through a second transmission path to the external terminal, wherein index information is added to the processing information of each unit of processing transmitted from the information transmission unit, and index information corresponding to the index information added to the processing information is added to the content data transmitted from the data transmission unit at a timing when processing is performed in accordance with the processing information of each unit of processing transmitted from the information transmission unit.

Furthermore, the present invention provides a reception apparatus including an information reception unit configured to receive processing information which is used to perform processing in synchronization with content data and to which index information is added for each unit of processing through a second transmission path from an external apparatus and configured to receive processing information to which index information is added, a data reception unit configured to receive the content data to which index information corresponding to the index information added to the processing information is added through a first transmission path from the external apparatus at a timing when processing corresponding to the processing information of each unit of processing received using the information reception unit is performed, and an information processing unit configured to perform the processing corresponding to the processing information of each unit of processing received using the information reception unit in accordance with the index information added to the content data received using the data reception unit.

In the transmission apparatus, the data transmission unit transmits the content data to the external apparatus (reception apparatus) through the first transmission path, and the information transmission unit transmits the processing information used to perform the processing in synchronization with the content data through the second transmission path.

For example, the content data is transmitted in a plurality of channels through the first transmission path to the external apparatus using differential signals. Furthermore, for example, the second transmission path corresponds to a bidirectional communication path including a certain line of the first transmission path, and the processing information is transmitted through the bidirectional communication path to the external apparatus. For example, the bidirectional communication path corresponds to a pair of differential transmission paths, and at least one (for example, an HPD line of HDMI cable) of the pair of differential transmission paths has a function of transmitting a connection state of the external apparatus using a direct current bias potential.

For example, the content data transmitted from the data transmission unit includes image data, and the processing information transmitted from the information transmission unit is used to display certain information superposed on an image corresponding to the image data. Furthermore, for example, the content data transmitted from the data transmission unit includes audio data, and the processing information transmitted from the information transmission unit is used to control output of audio corresponding to the audio data.

Index information is added to the processing information transmitted from the information transmission unit for each unit of processing. Furthermore, index information corresponding to the index information added to the processing information is added to the content data transmitted from the data transmission unit at a timing when processing is performed in accordance with the processing information of each unit of processing transmitted from the information transmission unit.

In the reception apparatus, the information reception unit receives the processing information transmitted from the external apparatus (transmission apparatus) through the second transmission path, and the data reception unit receives the content data transmitted through the first transmission path. Then, the information processing unit performs processing using the processing information of each unit of processing received using the information reception unit in accordance with the index information added to the content data received using the data reception unit.

As described above, in this embodiment, when the transmission apparatus transmits content data through the first transmission path to the reception apparatus and transmits processing information used to perform the processing in synchronization with the content data through the second transmission path, index information is added to the processing information for each unit of processing, and index information is added to the content data at a timing when the processing information of each unit of processing is processed. Therefore, in the reception apparatus, processing in synchronization with the content data can be easily performed.

For example, in a case where the content data includes image data and the processing information is used to superpose certain information on an image corresponding to the image data, for example, when the image corresponding to the image data to which the index information is added is to be displayed, certain information, i.e., Exif (Exchangeable Image File Format, for example) information on a shooting location, a shooting date and time, and the like can be superposed on the displayed image in accordance with the processing information of the unit of processing to which the index information is added.

Furthermore, for example, in a case where the content data includes audio data and the processing information is used to control output of audio corresponding to the audio data, for example, a muting mode can be set for the audio output or the muting mode may be cancelled at a timing when index information is added to the audio data.

Advantageous Effects

According to the present invention, when content data is transmitted through the first transmission path and processing information used to perform processing in synchronization with the content data through the second transmission path, index information is added to the processing information for each unit of processing and index information is added to the content data at a timing when the processing corresponding to the processing information of each unit of processing is processed. Therefore, on a reception side, certain processing can be easily performed in synchronization with the content data.

BRIEF DESCRIPTION OF THE DRAWINGS

FIG. 7 is a diagram illustrating pin arrangement (type A) of an HDMI terminal.

FIG. 9 is a diagram illustrating a configuration of a Vendor Specific InfoFrame packet.

FIGS. 10(*a*) and 10(*b*) are diagrams illustrating a data configuration of a General Control packet header and a data configuration of a General Control sub-packet.

FIGS. 11(*a*) and (*b*) are diagrams illustrating examples of a data configuration of an additional InfoFrame packet header and a data configuration of InfoFrame packet content.

FIGS. 24(*a*) and 24(*b*) are diagrams illustrating processing information transmitted from the disc recorder to a television receiver through a bidirectional communication path and a timing relationship between an index number added to content data transmitted from the disc recorder to the television receiver through the TMDS line and a display image.

FIGS. 26(*a*) and 26(*b*) are diagrams illustrating processing information transmitted from the disc recorder to the television receiver through a bidirectional communication path and a timing relationship between an index number added to content data transmitted from the disc recorder to the television receiver through the TMDS line and a display image.

FIG. 28 is a diagram illustrating an example of a data configuration of a new InfoFrame packet used for transmissions corresponding to the index numbers 1 to 3.

FIGS. 31(*a*) and 31(*b*) are diagrams illustrating processing information transmitted from a disc recorder to a television receiver through a bidirectional communication path and a timing relationship between an index number added to content data transmitted from the disc recorder to the television receiver through the TMDS line and a display image.

EXPLANATION OF REFERENCE NUMERALS

100 100A 100B AV system, 200 video camera recorder, 201 HDMI terminal, 202 HDMI transmission unit, 203 high-speed data line interface, 300 television receiver, 301 HDMI terminal, 302 HDMI reception unit, 303 high-speed data line interface, 400 disc recorder, 401 HDMI terminal, 402 HDMI transmission unit, 403 high-speed data line interface, 500 AV amplifier, 501 504 HDMI terminal, 502 HDMI reception unit, 503 506 high-speed data line interface, 505 HDMI transmission unit, 701 to 703 HDMI cable

DETAILED DESCRIPTION

Best Modes for Carrying Out the Invention

Figure 1:
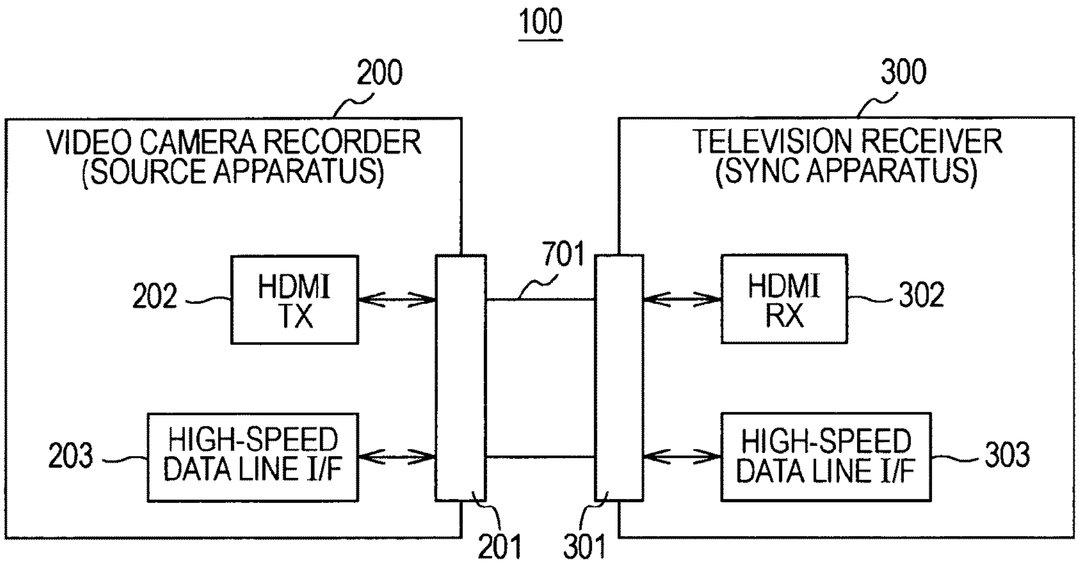
FIG. 1 is a block diagram illustrating a configuration example of an AV system according to an embodiment of the present invention.

Embodiments of the present invention will be described hereinafter with reference to the accompanying drawings. FIG. 1 shows a configuration example of an AV system 100 according to an embodiment.

The AV system 100 includes a video camera recorder (camcorder) 200 and a television receiver 300. The video camera recorder 200 constitutes a source apparatus of an HDMI. The television receiver 300 constitutes a sync apparatus of the HDMI.

The video camera recorder 200 is connected to the television receiver 300 through an HDMI cable 701. The video camera recorder 200 includes an HDMI terminal 201 connected to an HDMI transmission unit (HDMI TX) 202 and a high-speed data line interface 203. The television receiver 300 includes an HDMI terminal 301 connected to an HDMI reception unit (HDMI RX) 302 and a high-speed data line interface 303. The HDMI cable 701 is connected to the HDMI terminal 201 of the video camera recorder 200 at one terminal thereof and is connected to the HDMI terminal 301 of the television receiver 300 at the other terminal thereof.

In the AV system 100 shown in FIG. 1, the video camera recorder 200 transmits reproduced content data (image data and audio data) to the television receiver 300. The content data is transmitted from the HDMI transmission unit 202 of the video camera recorder 200 to the HDMI reception unit 302 of the television receiver 300 through a TMDS (Transition Minimized Differential Signaling) line of the HDMI cable 701. The television receiver 300 displays an image and outputs audio which correspond to the content data transmitted from the video camera recorder 200. Note that the HDMI cable 701 constitutes a first transmission path. Furthermore, the HDMI transmission unit 202 constitutes a data transmission unit and the HDMI reception unit 302 constitutes a data reception unit.

Moreover, in the AV system 100 shown in FIG. 1, the video camera recorder 200 transmits processing information used to perform processing in synchronization with the content data, that is, in this embodiment, processing for displaying information on a shooting location, a shooting date and time and the like (Exif information) to the television receiver 300. This processing information includes information representing that the processing information is used to perform the display processing and information representing display content including the shooting location, the shooting date and time, and the like. The processing information is transmitted from the video camera recorder 200 to the television receiver 300 through a bidirectional communication path constituted by a certain line included in the HDMI cable 701.

In this embodiment, the bidirectional communication path corresponds to a pair of differential transmission paths constituted by a reserved line and an HPD (Hot Plug Detect) line included in the HDMI cable 701. Note that the bidirectional communication path constitutes a second transmission path. The high-speed data line interface 203 of the video camera recorder 200 and the high-speed data line interface 303 of the television receiver 300 serve as interfaces of the bidirectional communication path described above. The high-speed data line interface 203 is included in an information transmission unit and the high-speed data line interface 303 is included in an information reception unit.

Index information such as an index number is added to the processing information transmitted from the video camera recorder 200 to the television receiver 300 for each unit of processing. Then, index information corresponding to the index information added to the processing information is added to the content data transmitted from the video camera recorder 200 to the television receiver 300 when the processing corresponding to the processing information is performed for each unit of processing.

In the AV system 100 shown in FIG. 1, as described above, the television receiver 300 displays an image corresponding to the image data transmitted from the video camera recorder 200. In the AV system 100 shown in FIG. 1, the information on the shooting location, the shooting date and time, and the like is displayed in accordance with the index information added to the reproduction content data at an appropriate timing so as to be superposed on the displayed image. For example, at a frame timing when certain index information is added, text representing the shooting location, the shooting date and time, and the like corresponding to the displayed image are superposed on the displayed image in accordance with the processing information for each unit of processing to which the index information is added.

Note that, in the television receiver 300, the text representing the shooting location, the shooting date, and time and the like may be superposed on the displayed image for display in accordance with the index information added to the reproduction content data when a user can set an on or off state of a information display mode and the information display mode is in an on state, as described above.

Figure 2:
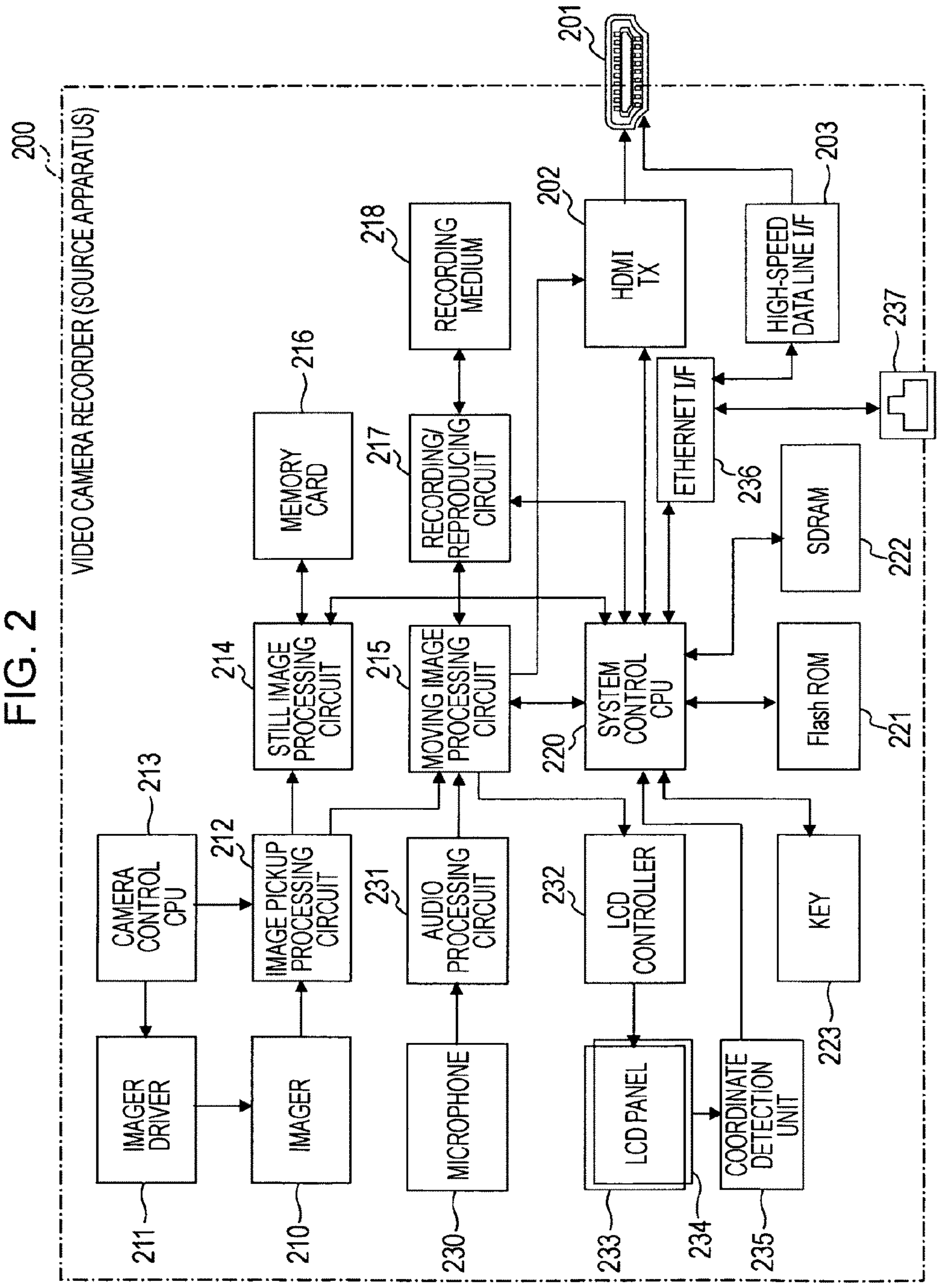
FIG. 2 is a block diagram illustrating a configuration example of a video camera recorder (source apparatus) included in the AV system.

FIG. 2 is a configuration example of the video camera recorder 200. The video camera recorder 200 includes the HDMI terminal 201, the HDMI transmission unit 202, the high-speed data line interface 203, an imager 210, an imager driver 211, an image pickup processing circuit 212, a camera control CPU 213, a still image processing circuit 214, a moving image processing circuit 215, a memory card 216, a recording/reproducing circuit 217, and a recording medium 218.

The video camera recorder 200 further includes a system control CPU 220, a flash ROM 221, an SDRAM 222, a key 223, a microphone 230, an audio processing circuit 231, an LCD (Liquid Crystal Display) controller 232, an LCD panel 233, a touch panel 234, a coordinate detection unit 235, an Ethernet interface (Ethernet I/F) 236, and a network terminal 237. Note that "Ethernet" is a registered trademark.

The imager 210 is constituted by a C-MOS image pickup device or a CCD image pickup device, for example. The imager driver 211 drives the imager 210. The image pickup processing circuit 212 processes an image pickup signal obtained using the imager 210 so as to generate a video signal (pickup image data) corresponding to a subject. The camera control CPU 213 controls operation of the imager driver 211 and operation of the image pickup processing circuit 212.

The still image processing circuit 214 performs compression encoding processing of a JPEG (Joint Photographic Experts Group) method, for example, on image data obtained using the image pickup processing circuit 212 when recording of a still image is performed so as to generate still image data. Furthermore, the still image processing circuit 214 writes the generated still image data to the memory card 216 or to the flash ROM 221 through the system control CPU 220.

Moreover, the still image processing circuit 214 generates data of a thumbnail corresponding to still mage data for an index and stores the data in the memory card 216. The thumbnail is generated for a corresponding video signal recorded in the recording medium 218 as described hereinafter. The thumbnail is used to generate a display signal for a GUI screen used when the user selects a video signal to be reproduced when reproduction is performed, for example.

The audio processing circuit 231 performs processing such as A/D conversion on an audio signal obtained using the microphone 230 so as to obtain audio data corresponding to the pickup image data. The moving image processing circuit 215 performs, when a moving image is recorded, processing such as compression encoding in accordance with a format of a recording medium on image data obtained using the image pickup processing circuit 212 along with audio data obtained using the audio processing circuit 231 so as to generate moving image data to which the audio data is added.

The recording/reproducing circuit 217 records, when the moving image is recorded, the moving image data generated using the moving image processing circuit 215 in the recording medium 218 which has been loaded. Furthermore, the recording/reproducing circuit 217 reads, when the moving image is reproduced, the moving image data from the recording medium 218, and performs decoding processing, for example, so as to obtain reproduction image data. As examples of the recording medium 218, an optical disc, a hard disk, a magnetic tape, and a semiconductor memory are applicable.

The LCD controller 232 drives the LCD panel 233 in accordance with the pickup image data obtained using the image pickup processing circuit 212 or the reproduction image data generated using the recording/reproducing circuit 217 so as to display an pickup image (moving image) or a reproduction image (moving image) on the LCD panel 233. Furthermore, the LCD controller 232 drives the LCD panel 233 in accordance with reproduction image data obtained from the memory card 216, for example, so as to display a reproduction image (still image) on the LCD panel 233.

Note that the system control CPU 220 superposes a display signal for the GUI (graphical user interface) screen on the image data (video signal) supplied to the LCD controller 232 using the moving image processing circuit 215, for example. The display signal for the GUI screen is used when the user operates a reproducing operation, for example, when reproduction is to be performed. Furthermore, the display signal for the GUI screen is used when the user operates an image pickup operation or a recording operation, for example, when image pickup is to be performed.

Since the display signal for the GUI screen is superposed on the image data supplied to the LCD controller 232, the GUI screen is superposed on the pickup image or the reproduction image displayed on the LCD panel 233. Therefore, the user can operate the image pickup operation or the recording operation, for example, when the image pickup is to be performed and can operate the reproducing operation when the reproduction is to be performed using the touch panel 234 disposed on the LCD panel 233.

The touch panel 234 constitutes a position specifying unit used to specify a position in a screen of the LCD panel 233, and is disposed on the screen of the LCD panel 233. The touch panel 234 is connected to the system control CPU 220 through the coordinate detection unit 235. The user can specify a position on the screen by directly touching the touch panel 234 by a finger or a pen.

The system control CPU 220 controls operation of the still image processing circuit 214, operation of the moving image processing circuit 215, and operation of the recording/reproducing circuit 217. The system control CPU 220 is connected to the flash ROM 221, the SDRAM 222, and the key 223. The flash ROM 221 stores a control program and the like of the system control CPU 220. Furthermore, the SDRAM 222 is used to temporarily store data required for control processing performed by the system control CPU 220.

The key 223 and the touch panel 234 described above constitute a user operation unit. The system control CPU 220 detects an operation state of the key 223 or information (coordinate information) on a position in the screen specified by the touch panel 234 and controls the operation of the video camera recorder 200. The user can operate the image pickup (recording) operation, the reproducing operation, and the like using the key 223.

The HDMI transmission unit 202 transmits image data (video signal) and audio data (audio signal) through the HDMI terminal 201 to the HDMI cable in a communication complying with an HDMI. Content data (image data and audio data) reproduced from the memory card 216 or the recording medium 218 is supplied through the system control CPU 220 to the HDMI transmission unit 202. The HDMI transmission unit 202 will be described in detail hereinafter.

The high-speed data line interface 203 is, as described above, an interface of a bidirectional communication path constituted by certain lines (the reserved line and the HPD line in this embodiment) of the HDMI cable connected to the HDMI terminal 201. The high-speed data line interface 203 is inserted between the Ethernet interface 236 and the HDMI terminal 201. Note that the Ethernet interface 236 is connected to the network terminal 237.

The high-speed data line interface 203 outputs transmission data supplied from the system control CPU 220 through the Ethernet interface 233 to the HDMI cable through the HDMI terminal 201. Furthermore, the high-speed data line interface 203 supplies reception data received from the HDMI cable through the HDMI terminal 201 to the system control CPU 220 through the Ethernet interface 236. The high-speed data line interface 203 will be described in detail hereinafter.

The operation of the video camera recorder 200 shown in FIG. 2 will be described.

An image pickup signal obtained using the imager 210 is supplied to the image pickup processing circuit 212 so as to be processed, and image data (pickup image data) corresponding to a subject is obtained from the image pickup processing circuit 212. When recording of a still image is performed, the still image processing circuit 214 performs compression encoding processing, for example, on the image data output from the image pickup processing circuit 212 so as to generate still image data. The still image data is recorded in the memory card 216, for example.

Furthermore, when recording of a moving image is performed, the moving image processing circuit 215 performs processing such as compression encoding in accordance with a format of a recording medium on image data output from the image pickup processing circuit 212 and audio data output from the audio processing circuit 231 so as to generate moving image data to which the audio data is added. The recording/reproducing circuit 217 stores the moving image data in the recording medium 218.

When recording of a still image and a moving image is performed, an image pickup video signal on which a display signal for the GUI screen which is to be operated by the user so that the image pickup operation, the recording operation and the like are performed is superposed is supplied to the LCD controller 232, and a pickup image on which the GUI screen is superposed is displayed on the LCD panel 233. Therefore, the user can operate the image pickup operation, the recording operation and the like using the touch panel 234 disposed on the LCD panel 233. Note that the user can similarly operate the image pickup operation, the recording operation, and the like using the key 223.

When the still image is to be reproduced, the still image data is read from the memory card 216, for example, and the still image processing circuit 214 performs processing such as decoding so as to obtain reproduction image data. The reproduction image data is supplied through the system control CPU 220 and the moving image processing circuit 215 to the LCD controller 232, and then a still image is displayed on the LCD panel 233.

When the moving image is to be reproduced, the recording/reproducing circuit 217 reads the moving image data from the recording medium 218, and the moving image processing circuit 215 performs processing such as decoding so as to obtain reproduction image data. The reproduction image data is supplied to the LCD controller 232, and a moving image is displayed on the LCD panel 233.

When a still image and a moving image are to be reproduced, the a reproduction video signal on which a display signal for the GUI screen used by the user so that a reproducing operation and the like are performed is superposed is supplied to the LCD controller 232, and a pickup image on which the GUI screen is superposed is displayed on the LCD panel 233. Therefore, the user can operate the reproducing operation and the like using the touch panel 234 disposed on the LCD panel 233. Note that the user can similarly operate the reproducing operation and the like using the key 223.

Note that, the content data (image data and audio data) reproduced from the memory card 216 or the recording medium 218 is supplied from the system control CPU 220 to the HDMI transmission unit 202. After being supplied to the HDMI transmission unit 202, the content data is transmitted to the HDMI cable connected to the HDMI terminal 201.

Figure 3:
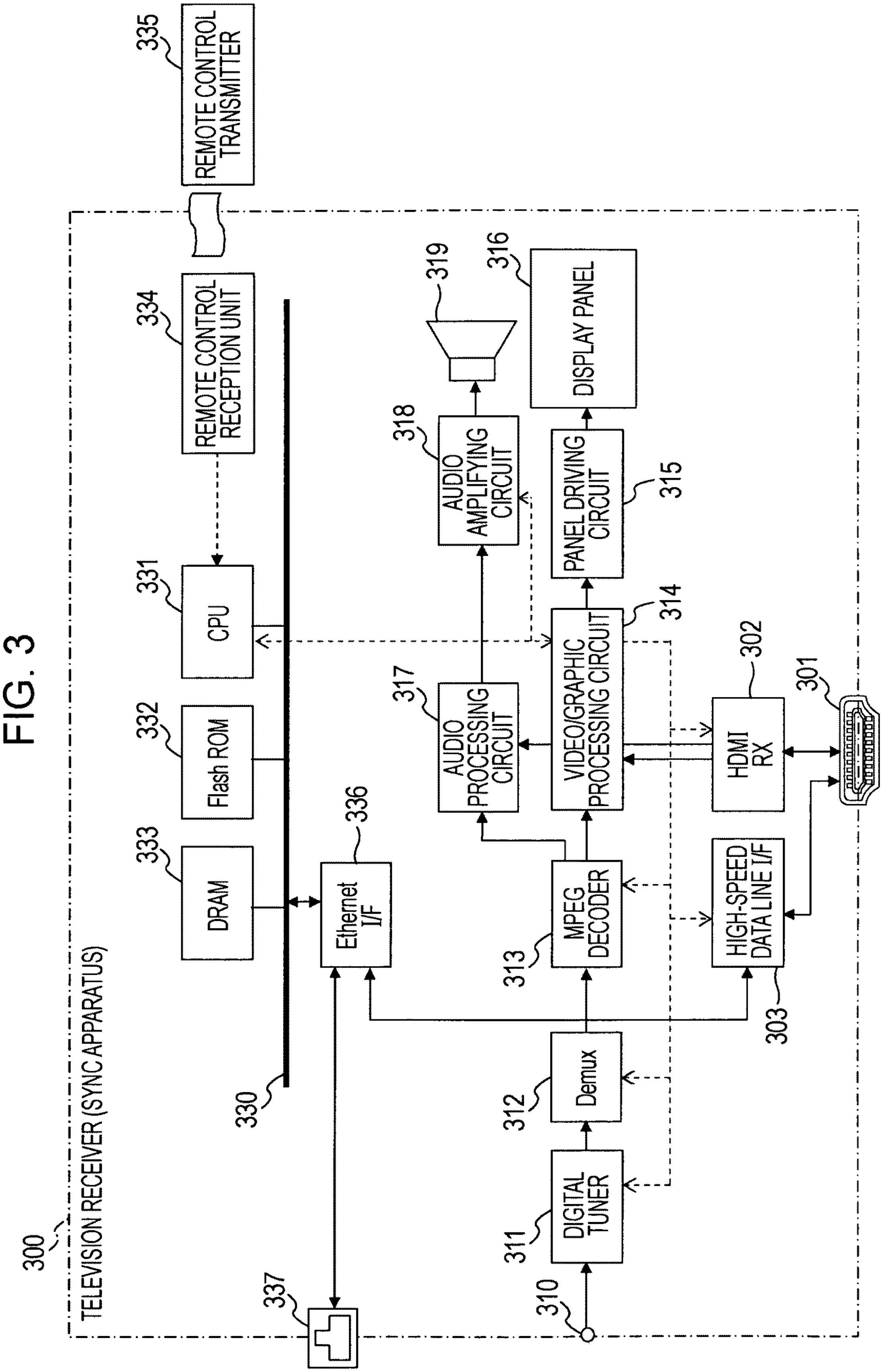
FIG. 3 is a block diagram illustrating a configuration example of a television receiver (sync apparatus) included in the AV system.

FIG. 3 shows a configuration example of the television receiver 300. The television receiver 300 includes the HDMI terminal 301, the HDMI reception unit 302, the high-speed data line interface 303, an antenna terminal 310, a digital tuner 311, a demultiplexer 312, an MPEG (Moving Picture Expert Group) decoder 313, a video/graphic processing circuit 314, a panel driving circuit 315, a display panel 316, an audio processing circuit 317, an audio amplifying circuit 318, and a speaker 319.

The television receiver 300 further includes an internal bus 330, a CPU 331, a flash ROM 332, a DRAM 333, a remote control reception unit 334, a remote control transmitter 335, an Ethernet interface (Ethernet I/F) 336, and a network terminal 337.

The CPU 331 controls operation of the various units of the television receiver 300. The flash ROM 332 stores control software and data. The DRAM 333 constitutes a workarea, for example, for the CPU 331. The CPU 331 loads the software and the data read from the flash ROM 332 to the DRAM 333 so as to activate the software, and controls the various units of the television receiver 300. The CPU 331, the flash ROM 332, and the DRAM 333 are connected to the internal bus 330.

The remote control reception unit 334 receives an infrared remote control signal (remote control code), for example, transmitted from the remote control transmitter 335 and supplies the remote control signal to the CPU 331. The user can operate the television receiver 300 by operating the remote control transmitter 335, and further operate another CEC-compatible apparatus connected through the HDMI cable to the television receiver 300.

The antenna terminal 310 is used to input a television broadcasting signal received using a reception antenna (not shown). The digital tuner 311 processes the television broadcasting signal input through the antenna terminal 310 so as to output a certain transport stream corresponding to a channel selected by the user. The demultiplexer 312 extracts partial TSs (Transport Stream) (a TS packet of video data and a TS packet of audio data) corresponding to the channel selected by the user from the transport stream obtained using the digital tuner 311.

Furthermore, the demultiplexer 312 extracts PSI/SI (Program Specific Information/Service Information) from the transport stream obtained using the digital tuner 311 and outputs the PSI/SI to the CPU 331. The transport stream obtained using the digital tuner 311 includes a plurality of channels which have been multiplexed with one another. The demultiplexer 312 extracts a partial TS of an arbitrary channel from the transport stream by obtaining information on a packet ID (PID) of the arbitrary channel from the PSI/SI (PAT/PMT).

The MPEG decoder 313 performs decoding processing on a video PES (Packetized Elementary Stream) packet constituted by the TS packet of the video data obtained using the demultiplexer 312 so as to obtain the video data. Furthermore, the MPEG decoder 313 performs decoding processing on an audio PES packet constituted by the TS packet of the audio data obtained using the demultiplexer 312 so as to obtain the audio data.

The video/graphic processing circuit 314 performs scaling processing and processing for superposing graphic data on the video data obtained using the MPEG decoder 313 where appropriate. The panel driving circuit 315 drives the display panel 316 in accordance with the video data output from the video/graphic processing circuit 314. The display panel 316 is constituted by an LCD (Liquid Crystal Display) or a PDP (Plasma Display Panel), for example.

The audio processing circuit 317 performs required processing such as D/A conversion on the audio data obtained using the MPEG decoder 313. The audio amplifying circuit 318 amplifies an analog audio signal output from the audio processing circuit 317 and supplies the analog audio signal to the speaker 319.

The HDMI reception unit 302 receives image data (video signal) and audio data (audio signal) in a baseband input to the HDMI terminal from the HDMI cable in a communication complying with the HDMI. The HDMI reception unit 302 will be described in detail hereinafter.

As described above, the high-speed data line interface 303 is used for a bidirectional communication path constituted by certain lines (the reserved line and the HPD line in this embodiment) of the HDMI cable connected to the HDMI terminal 301. The high-speed data line interface 303 is inserted between the Ethernet interface 336 and the HDMI terminal 301. Note that the Ethernet interface 336 is connected to the network terminal 337.

The high-speed data line interface 303 outputs transmission data supplied from the CPU 331 through the Ethernet interface 336 to the HDMI cable through the HDMI terminal 301. Furthermore, the high-speed data line interface 303 supplies reception data received from the HDMI cable through the HDMI terminal 301 to the CPU 331 through the Ethernet interface 336. The high-speed data line interface 303 will be described in detail hereinafter.

The operation of the television receiver 300 shown in FIG. 3 will be briefly described. A television broadcasting signal input through the antenna terminal 310 is supplied to the digital tuner 311. The digital tuner 311 processes the television broadcasting signal so as to obtain a transport stream corresponding to a channel selected by the user. The transport stream is supplied to the demultiplexer 312. The demultiplexer 312 extracts partial TSs (a TS packet of video data and a TS packet of audio data) corresponding to the channel selected by the user. The partial TSs are supplied to the MPEG decoder 313.

The MPEG decoder 313 performs decoding processing on a video PES packet constituted by the TS packet of the video data so as to obtain video data. The video/graphic processing circuit 314 performs scaling processing on the video data and processing for superposing graphic data on the video data where appropriate, and then, the video data is supplied to the panel driving circuit 315. Therefore, an image corresponding to the channel selected by the user is displayed on the display panel 316.

The MPEG decoder 313 performs decoding processing on an audio PES packet constituted by the TS packet of the audio data so as to obtain audio data. The audio processing circuit 317 performs required processing such as D/A conversion on the audio data, and then, the audio amplifying circuit 318 amplifies the audio data. Then, the audio data is supplied to the speaker 319. Therefore, audio corresponding to the channel selected by the user is output from the speaker 319.

Furthermore, the HDMI reception unit 302 obtains video data and audio data input to the HDMI terminal 301 through the HDMI cable. The video data is supplied to the video/graphic processing circuit 314. The audio data is supplied to the audio processing circuit 317. Thereafter, as with the operation performed when a television broadcasting signal is received as described above, an image is displayed on the display panel 316 and audio is output from the speaker 319.

Figure 4:
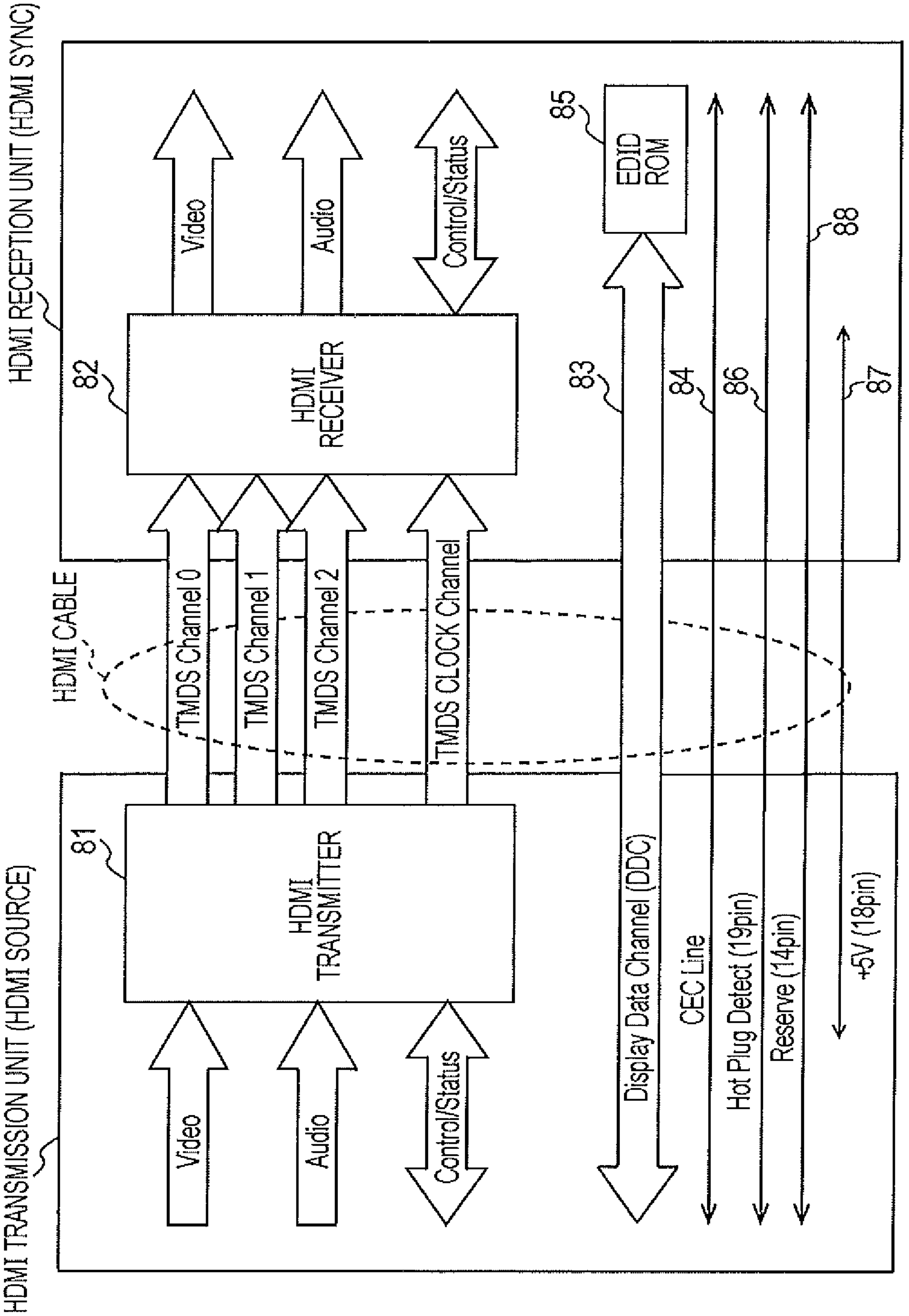
FIG. 4 is a block diagram illustrating configuration examples of an HDMI transmission unit (HDMI source) and an HDMI reception unit (HDMI sync).

FIG. 4 shows configuration examples of the HDMI transmission unit (HDMI source) of the source apparatus (video camera recorder 200) and the HDMI reception unit (HDMI sync) of the sync apparatus (television receiver 300).

The HDMI transmission unit transmits, in an effective image period (hereinafter referred to as an "active video period" where appropriate) which is obtained by subtracting a horizontal blanking period and a vertical blanking period from a period between one vertical synchronization signal and the next vertical synchronization signal, a differential signal corresponding to pixel data of an image for a screen which has not been compressed to the HDMI reception unit through a plurality of channels in a single direction, and a differential signal corresponding to at least audio data which accompanies the image, control data, auxiliary data, and the like to the HDMI reception unit through a plurality of channels in a single direction.

That is, the HDMI transmission unit includes a transmitter 81. The transmitter 81 converts pixel data of an uncompressed image into a corresponding differential signal, for example, and transmits the differential signal to the HDMI reception unit connected through the HDMI cable through a plurality of channels, i.e., three TMDS channels #0, #1, and #2 in a single direction as a serial transmission.

Furthermore, the transmitter 81 converts the audio data which accompanies the image, the required control data, auxiliary data and the like into respective differential signals and transmits the differential signals to the HDMI reception unit connected through the HDMI cable through a plurality of channels, i.e., three TMDS channels #0, #1, and #2 in a single direction as a serial transmission.

Furthermore, the transmitter 81 transmits, using a TMDS clock channel, a pixel clock synchronized with the pixel data to be transmitted through the three TMDS channels #0, #1, and #2 to the HDMI reception unit connected through the HDMI table. Here, in each of the TMDS channels #i (i=0, 1, 2), pixel data of 10 bits is transmitted in a period of one clock of the pixel clock.

The HDMI reception unit receives the differential signal corresponding to the pixel data transmitted from the HDMI transmission unit through the plurality of channels in a single direction, and receives the differential signals corresponding to the audio data and the control data transmitted from the HDMI transmission unit through the plurality of channels in a single direction.

That is, the HDMI reception unit includes a receiver 82. The receiver 82 receives the differential signal corresponding to the pixel data and the differential signals corresponding to the audio data and the control data which are transmitted in a single direction from the HDMI transmission unit connected through the HDMI cable so as to be in synchronization with the pixel clock transmitted from the same HDMI transmission unit through the TMDS clock channel.

A transmission channel of the HDMI system including the HDMI transmission unit and the HDMI reception unit includes the three TMDS channels #0 to #2 serving as transmission channels used to transmit in a single direction pixel data and audio data from the HDMI transmission unit to the HDMI reception unit so as to be in synchronization with the pixel clock, includes the TMDS clock channel serving as a transmission channel used to transmit the pixel clock, and further includes other transmission channels such as a DDC (Display Data Channel) 83 and a CEC line 84.

The DDC 83 includes two signal lines, not shown, included in the HDMI cable, and is used when the HDMI transmission unit reads E-EDID (Enhanced Extended Display Identification Data) from the HDMI reception unit connected through the HDMI cable.

Specifically, the HDMI reception unit includes, in addition to the HDMI receiver 82, an EDID ROM (Read Only Memory) 85 which stores the E-EDID which is information on the capability (Configuration/capability) of the HDMI reception unit. The HDMI transmission unit reads the E-EDID of the HDMI reception unit from the HDMI reception unit connected through the HDMI cable through the DDC 83, and in accordance with the E-EDID, recognizes a format (profile), such as RGB, YCbCr 4:4:4, or YCbCr 4:2:2, of an image corresponding to an electronic apparatus including the HDMI reception unit, for example.

The CEC line 84 is constituted by one signal line, not shown, included in the HDMI cable, and is used when bidirectional communication of the control data is performed between the HDMI transmission unit and the HDMI reception unit.

The HDMI cable further includes a line 86 referred to as an HPD (Hot Plug Detect) which is connected to a pin. The source apparatus can detect a connection of the sync apparatus using the line 86. The HDMI cable still further includes a line 87 used to supply power source from the source apparatus to the sync apparatus. The HDMI cable further includes a reserved line 88.

Figure 5:
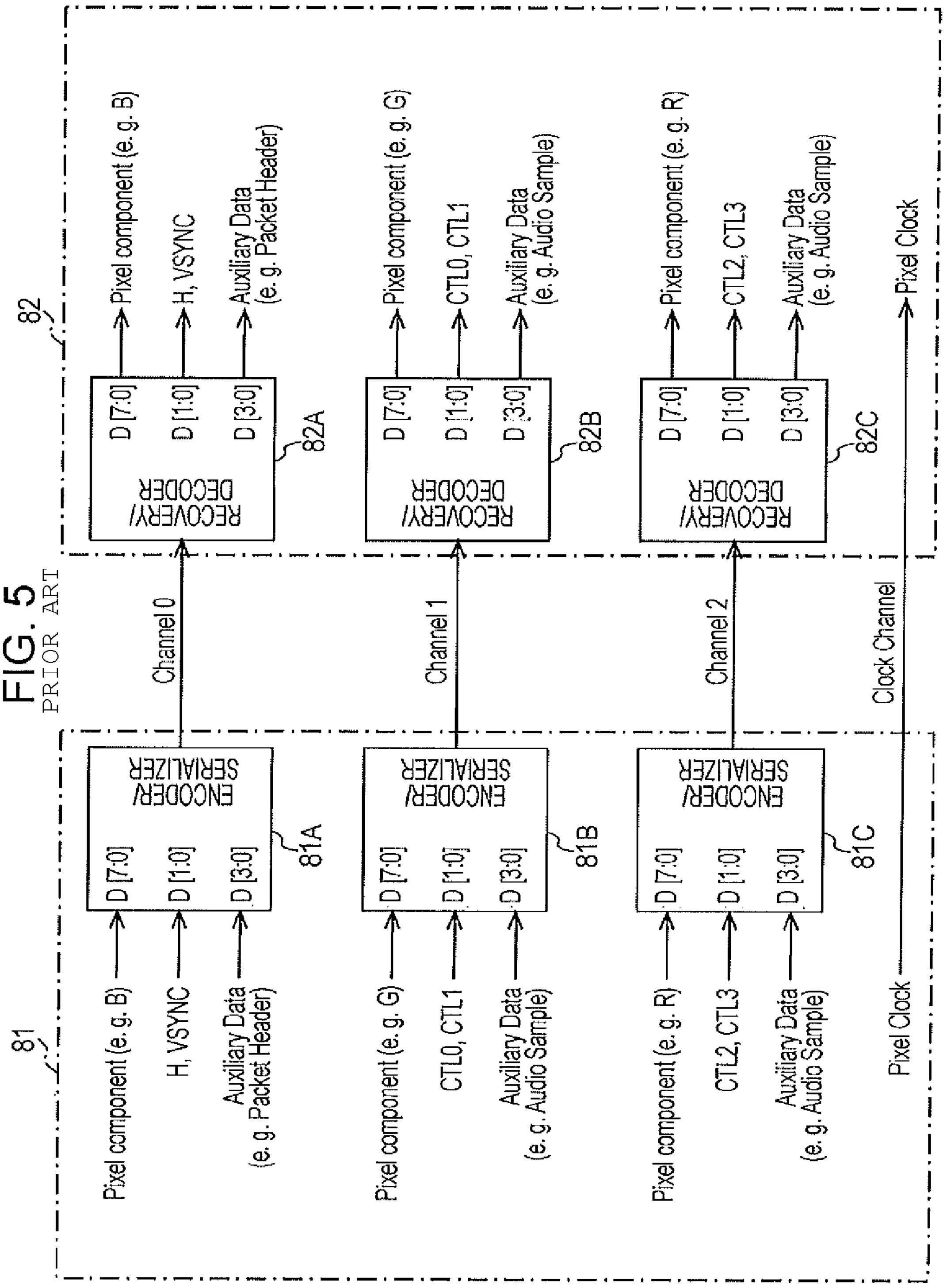
FIG. 5 is a block diagram illustrating configuration examples of an HDMI transmitter and an HDMI receiver.

FIG. 5 shows configuration examples of the HDMI transmitter 81 and the HDMI receiver 82 shown in FIG. 4.

The transmitter 81 includes three encoder/serializer units 81A, 81B, and 81C corresponding to the three TMDS channels #0, #1, and #2. Then, each of the encoder/serializer units 81A, 81B, and 81C encodes image data, auxiliary data, and control data supplied thereto, converts them from parallel data to serial data, and transmits using differential signals. Here, in a case where the image data includes three components, i.e., R (red), G (green), and B (blue) components, for example, the B component is supplied to the encoder/serializer unit 81A, the G component is supplied to the encoder/serializer unit 81B, and the R component is supplied to the encoder/serializer unit 81C.

The auxiliary data includes, for example, audio data and a control packet. For example, the control packet is supplied to the encoder/serializer unit 81A, and the audio data is supplied to the encoder/serializer units 81B and 81C.

Furthermore, the control data includes a vertical synchronization signal (VSYNC) of 1 bit, a horizontal synchronization signal (HSYNC) of 1 bit, and control bits CTL0, CTL1, CTL2, and CTL3 each of which corresponds to 1 bit. The vertical synchronization signal and the horizontal synchronization signal are supplied to the encoder/serializer unit 81A. The control bits CTL0 and CTL1 are supplied to the encoder/serializer unit 81B, and the control bits CTL2 and CTL3 are supplied to the encoder/serializer unit 81C.

The encoder/serializer unit 81A transmits the B component of the image data, the vertical synchronization signal, the horizontal synchronization signal, and the auxiliary data supplied thereto in a time sharing manner. Specifically, the encoder/serializer unit 81A converts the B component of the image data supplied thereto into parallel data of a unit of 8-bit which is a fixed bit number. Furthermore, the encoder/serializer unit 81A encodes the parallel data and converts the parallel data into serial data, and transmits the serial data through the TMDS channel #0.

Furthermore, the encoder/serializer unit 81A encodes the parallel data of 2 bits, that is, the vertical synchronization signal and the horizontal synchronization signal, converts the parallel data into serial data, and transmits the serial data through the TMDS channel #0. Furthermore, the encoder/serializer unit 81A converts the auxiliary data supplied thereto into parallel data of a unit of 4 bit. Then, the encoder/serializer unit 81A encodes the parallel data, converts the parallel data into serial data, and transmits the serial data through the TMDS channel #0.

The encoder/serializer unit 81B transmits the G component of the image data, the control bits CTL0 and CTL1, and the auxiliary data supplied thereto in a time sharing manner. Specifically, the encoder/serializer unit 81B converts the G component of the image data supplied thereto into parallel data of a unit of 8 bit which is a fixed bit number. Furthermore, the encoder/serializer unit 81B encodes the parallel data, converts the parallel data into serial data, and transmits the serial data through the TMDS channel #1.

Furthermore, the encoder/serializer unit 81B encodes the parallel data of 2 bits, i.e., the control bits CTL0 and CTL1 supplied thereto, converts the parallel data into serial data, and transmits the serial data through the TMDS channel #1. Furthermore, the encoder/serializer unit 81B converts the auxiliary data supplied thereto into parallel data in a unit of 4 bits. Then, the encoder/serializer unit 81B encodes the parallel data, converts the parallel data into serial data, and transmits the serial data through the TMDS channel #1.

The encoder/serializer unit 81C transmits the R component of the image data, the control bits CTL2 and CTL3, and the auxiliary data supplied thereto in a time sharing manner. Specifically, the encoder/serializer unit 81C converts the R component of the image data supplied thereto into parallel data of a unit of 8 bit which is a fixed bit number. Furthermore, the encoder/serializer unit 81C encodes the parallel data, converts the parallel data into serial data, and transmits the serial data through the TMDS channel #2.

Furthermore, the encoder/serializer unit 81C encodes the parallel data of 2 bits, i.e., the control bits CTL2 and CTL3 supplied thereto, converts the parallel data into serial data, and transmits the serial data through the TMDS channel #2. Furthermore, the encoder/serializer unit 81C converts the auxiliary data supplied thereto into parallel data in a unit of 4 bits. Then, the encoder/serializer unit 81C encodes the parallel data, converts the parallel data into serial data, and transmits the serial data through the TMDS channel #2.

The receiver 82 includes three recovery/decoder units 82A, 82B, and 82C corresponding to the three TMDS channels #0, #1, and #2. Then, each of the recovery/decoder units 82A, 82B, and 82C receives image data, auxiliary data, and control data transmitted using differential signals through a corresponding one of the TMDS channels #0, #1, and #2. Furthermore, each of the recovery/decoder units 82A, 82B, and 82C converts the image data, the auxiliary data, and the control data from serial data into parallel data, decodes them, and outputs them.

That is, the recovery/decoder unit 82A receives the B component of the image data, the vertical synchronization signal, the horizontal synchronization signal, and the auxiliary data transmitted using the differential signal through the TMDS channel #0. Then, the recovery/decoder unit 82A converts the B component of the image data, the vertical synchronization signal, the horizontal synchronization signal, and the auxiliary data from serial data into parallel data, decodes them, and outputs them.

The recovery/decoder unit 82B receives the G component of the image data, the control bits CTL0 and CTL1, and the auxiliary data transmitted using the differential signal through the TMDS channel #1. Then, the recovery/decoder unit 82B converts the G component of the image data, the control bits CTL0 and CTL1, and the auxiliary data from serial data into parallel data, decodes them, and outputs them.

The recovery/decoder unit 82C receives the R component of the image data, the control bits CTL2 and CTL3, and the auxiliary data transmitted using the differential signal through the TMDS channel #2. Then, the recovery/decoder unit 82C converts the R component of the image data, the control bits CTL2 and CTL3, and the auxiliary data from serial data into parallel data, decodes them, and outputs them.

Figure 6:
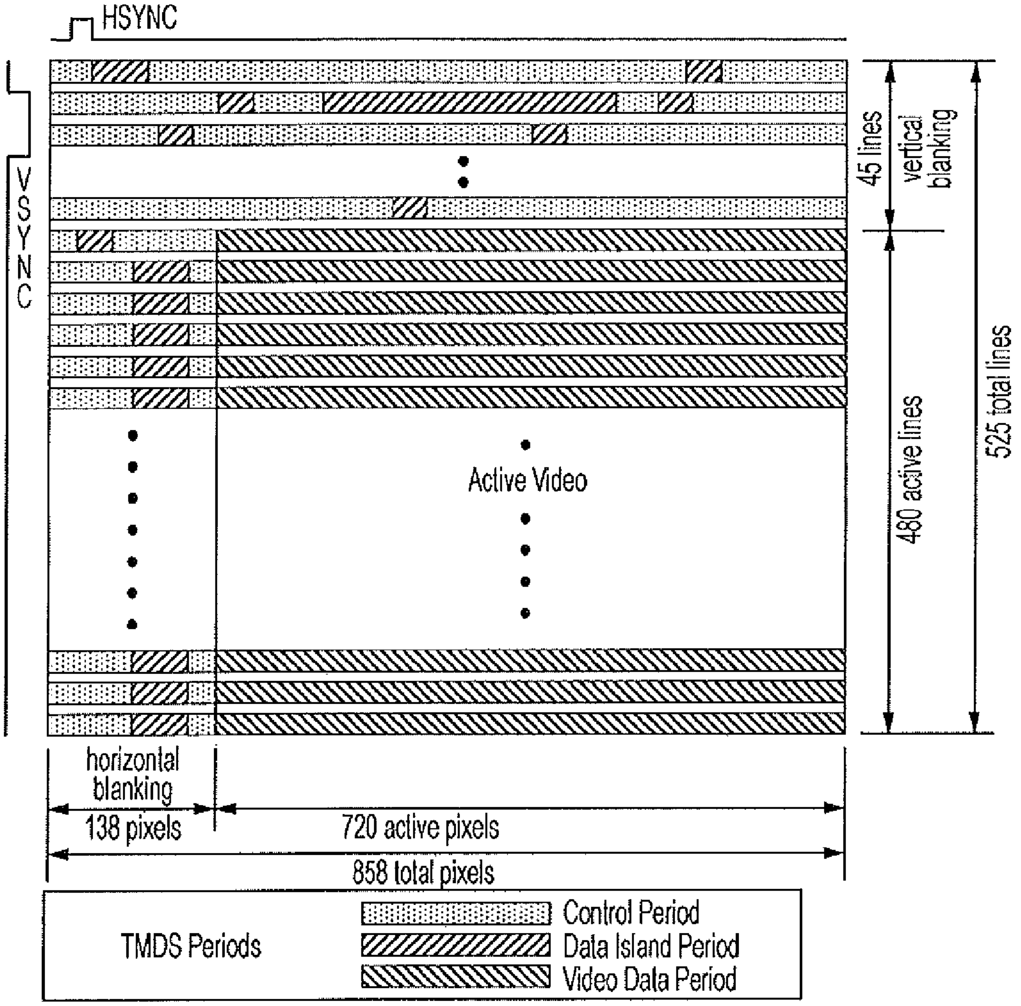
FIG. 6 is a diagram illustrating a configuration of TMDS transmission data.

FIG. 6 shows examples of transmission periods (terms) in which various transmission data items are transmitted through three TMDS channels #0, #1, and #2 of HDMI. Note that FIG. 6 shows periods for various transmission data items when a progressive image having a matrix of 720 columns and 480 rows is transmitted through the TMDS channels #0, #1, and #2.

In a video field in which transmission data is to be transmitted through the three TMDS channels #0, #1, and #2, three types of periods, i.e., a video data period, a data island period, and a control period are included in accordance with types of the transmission data.

Here, a period of the video field corresponds to a period from an active edge of a vertical synchronization signal to an active edge of the next vertical synchronization signal, and is divided into a horizontal blanking period (horizontal blanking), a vertical blanking period (vertical blanking), and an active video period (Active Video) which is obtained by subtracting the horizontal blanking period and the vertical blanking period from the video field period.

The video data period is assigned to the active video period. In the video data period, data representing active pixels of the matrix of 720 pixels and 480 lines constituting image data for one screen which has not been compressed is transmitted.

The data island period and the control period are assigned to the horizontal blanking period and the vertical blanking period. In the data island period and the control period, auxiliary data is transmitted.

That is, the data island period is assigned to portions of the horizontal blanking period and the vertical blanking period. In the data island period, for example, a packet of data which has nothing to do with control, such as audio data, in the auxiliary data is transmitted.

The control period is assigned to the other portions of the horizontal blanking period and the vertical blanking period. In the control period, for example, a vertical synchronization signal, a horizontal synchronization signal, and a control packet which are associated with the control in the auxiliary data are transmitted.

Here, in the existing HDMI, a frequency of the pixel clock transmitted through the TMDS clock channel is 165 MHz, for example, and in this case, a transmission rate in the data island period is approximately 500 Mbps.

FIG. 7 shows pin arrangement of the HDMI terminal. The pin arrangement of a type-A is shown.

Two lines which are differential lines used to transmit differential signals TMDS Data#i+ and TMDS Data#i− of a TMDS channel #i are connected to pins (corresponding to pin numbers 1, 4, and 7) to which the TMDS Data#i+ is assigned and pins (corresponding to pin numbers 3, 6, and 9) to which the TMDS Data#i− is assigned.

Furthermore, the CEC line 84 used to transmit a CEC signal corresponding to control data is connected to a pin corresponding to a pin number 13, and a pin corresponding to a pin number 14 is a vacant (reserved) pin. Moreover, a line used to transmit an SDA (Serial Data) signal such as an E-EDID signal is connected to a pin corresponding to a pin number 16, and a line used to transmit an SCL (Serial Clock) signal serving as a clock signal used for synchronization when the SDA signal is transmitted and received is connected to a pin corresponding to a pin number 15. The DDC 83 described above is constituted by the line used to transmit the SDA signal and the line used to transmit the SCL signal.

Furthermore, as described above, the line 86 used to detect a connection between the source apparatus and the sync apparatus is connected to a pin corresponding to a pin number 19. Moreover, the line 87 used to supply electric power as described above is connected to a pin corresponding to a pin number 18.

Figure 8:
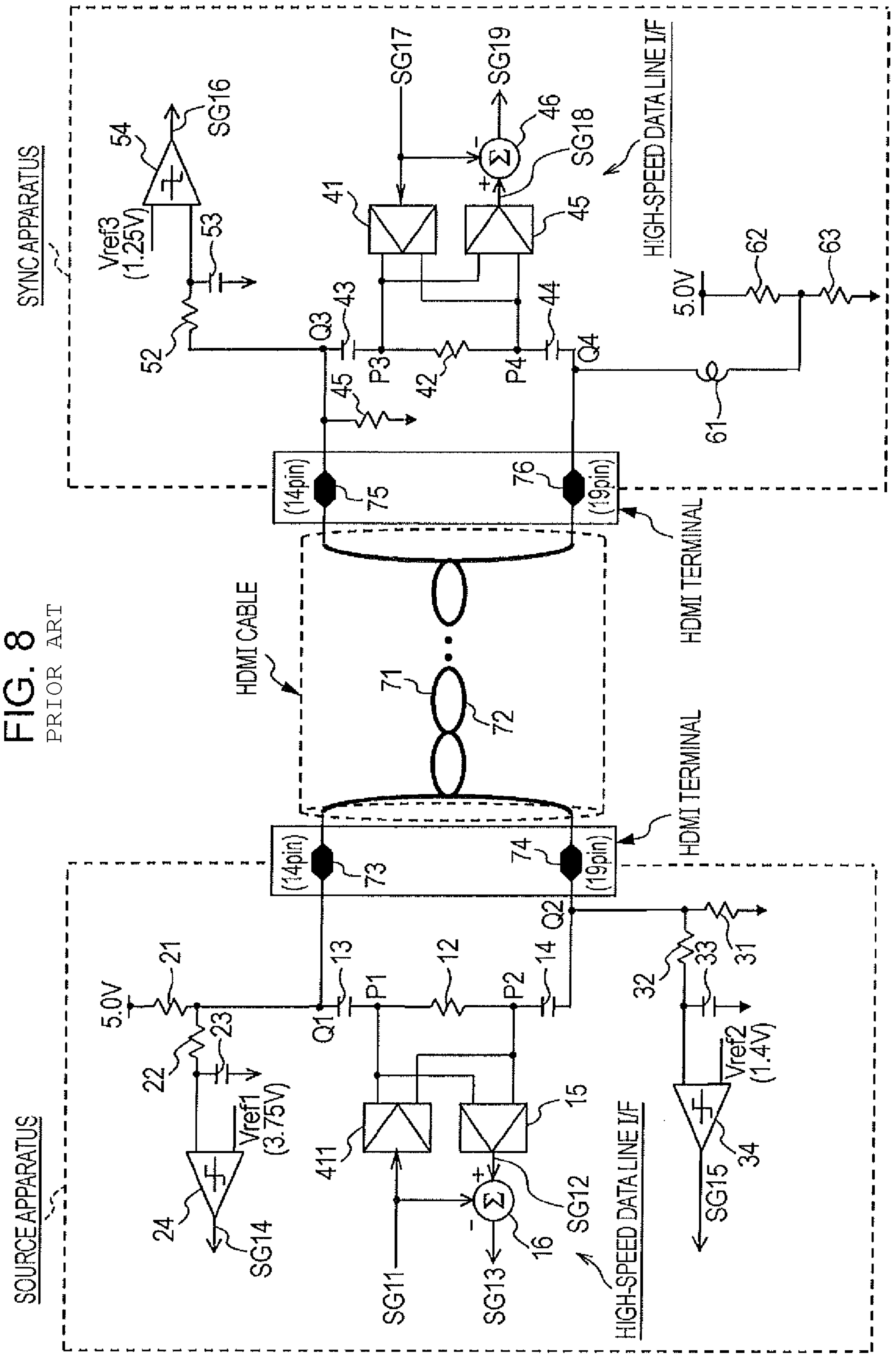
FIG. 8 is a connection diagram illustrating configuration examples of high-speed data line interfaces of the source apparatus and the sync apparatus.

FIG. 8 shows configuration examples of the high-speed data line interfaces of the source apparatus and the sync apparatus. The high-speed data line interfaces constitute communication units which perform LAN (Local Area Network) communication. The communication units perform communication using, among a plurality of lines included in the HDMI cable, a bidirectional communication path constituted by a pair of differential lines, a reserved line (Ether−line) corresponding to the vacant (reserve) pin (pin 14), and an HPD line (Ether+line) corresponding to the HPD pin (pin 19) in this embodiment.

The source apparatus includes a LAN signal transmission circuit 11, a terminal resistor 12, AC coupling capacitors 13 and 14, a LAN signal reception circuit 15, a subtracting circuit 16, a pull-up resistor 21, a resistor 22 and a capacitor 23 which constitute a lowpass filter, a comparator 24, a pull-down resistor 31, a resistor 32 and a capacitor 33 which constitute a lowpass filter, and a comparator 34. Here, the high-speed data line interface (high speed data line I/F) is constituted by the LAN signal transmission circuit 11, the terminal resistor 12, the AC coupling capacitors 13 and 14, the LAN signal reception circuit 15, and the subtracting circuit 16.

A series circuit including the pull-up resistor 21, the AC coupling capacitor 13, the terminal resistor 12, the AC coupling capacitor 14, and the pull-down resistor 31 is connected between a power supply line (+5.0 V) and a ground line. A connection point P1 which connects the AC coupling capacitor 13 to the terminal resistor 12 is connected to a positive output side of the LAN signal transmission circuit 11, and also connected to a positive input side of the LAN signal reception circuit 15. Furthermore, a connection point P2 which connects the AC coupling capacitor 14 to the terminal resistor 12 is connected to a negative output side of the LAN signal transmission circuit 11, and also connected to a negative input side of the LAN signal reception circuit 15. A transmission signal (transmission data) SG11 is supplied to an input side of the LAN signal transmission circuit 11.

Furthermore, an output signal SG12 output from the LAN signal reception circuit 15 is supplied to a positive terminal of the subtracting circuit 16, and the transmission signal (transmission data) SG11 is supplied to a negative terminal of the subtracting circuit 16. The subtracting circuit 16 subtracts the transmission signal SG11 from the signal SG12 output from the LAN signal reception circuit 15 so as to obtain a reception signal (reception data) SG13.

Furthermore, a connection point Q1 which connects the pull-up resistor 21 to the AC coupling capacitor 13 is connected to the ground line through a series circuit including the resistor 22 and the capacitor 23. Then, a signal output from the lowpass filter obtained at a connection point which connects the resistor 22 to the capacitor 23 is supplied to one input terminal of the comparator 24. The comparator 24 compares the signal output from the lowpass filter with a reference voltage Vref1 (+3.75 V) which is supplied to the other input terminal. A signal SG14 output from the comparator 24 is supplied to the control unit (CPU) of the source apparatus.

A connection point Q2 which connects the AC coupling capacitor 14 to the pull-down resistor 31 is connected to the ground line through a series circuit including the resistor 32 and the capacitor 33. Then, a signal output from the lowpass filter obtained at a connection point which connects the resistor 32 to the capacitor 33 is supplied to one input terminal of the comparator 34. The comparator 34 compares the signal output from the lowpass filter with a reference voltage Vref2 (+1.4 V) supplied to the other input terminal. A signal SG15 output from the comparator 34 is supplied to the control unit (CPU) of the source apparatus.

The sync apparatus includes a LAN signal transmission circuit 41, a terminal resistor 42, AC coupling capacitors 43 and 44, a LAN signal reception circuit 45, a subtracting circuit 46, a pull-up resistor 51, a resistor 52 and a capacitor 53 which constitute a lowpass filter, a comparator 54, a choke coil 61, a resistor 62, and a resistor 63. Here, the high-speed data line interface (high speed data line I/F) is constituted by the LAN signal transmission circuit 41, the terminal resistor 42, the AC coupling capacitors 43 and 44, the LAN signal reception circuit 45, and the subtracting circuit 46.

A series circuit including the resistor 62 and the resistor 63 is connected between a power supply line (+5.0 V) and a ground line. Then, a series circuit including the choke coil 61, the AC coupling capacitor 44, the terminal resistor 42, the AC coupling capacitor 43, and the pull-up resistor 51 is connected between a connection point which connects the resistor 62 to the resistor 63 and the ground line.

A connection point P3 which connects the AC coupling capacitor 43 to the terminal resistor 42 is connected to a positive output side of the LAN signal transmission circuit 41 and also connected to a positive input side of the LAN signal reception circuit 45. Furthermore, a connection point P4 which connects the AC coupling capacitor 44 to the terminal resistor 42 is connected to a negative input side of the LAN signal transmission circuit 41 and also connected to a negative input side of the LAN signal reception circuit 45. A transmission signal (transmission data) SG17 is supplied to an input side of the LAN signal transmission circuit 41.

Furthermore, a signal SG18 output from the LAN signal reception circuit 45 is supplied to a positive terminal of the subtracting circuit 46, and the transmission signal SG17 is supplied to a negative terminal of the subtracting circuit 46. The subtracting circuit 46 subtracts the transmission signal SG17 from the signal SG18 output from the LAN signal reception circuit 45 so as to obtain a reception signal (reception data) SG19.

Moreover, a connection point Q3 which connects the pull-up resistor 51 to the AC coupling capacitor 43 is connected to the ground line through a series circuit including the resistor 52 and the capacitor 53. Then, a signal output from the lowpass filter obtained between a connection point which connects the resistor 52 to the capacitor 53 is supplied to one input terminal of the comparator 54. The comparator 54 compares the signal output from the lowpass filter with a reference voltage Vref3 (+1.25 V) supplied to the other input terminal. A signal SG16 output from the comparator 54 is supplied to the control unit (CPU) of the sync apparatus.

A reserved line 71 and an HPD line 72 included in the HDMI cable constitute a differential twist pair. A source-side terminal 73 of the reserved line 71 is connected to a pin 14 of the HDMI terminal of the source apparatus, and a sync-side terminal 75 of the reserved line 71 is connected to a pin 14 of the HDMI terminal of the sync apparatus. Furthermore, a source-side terminal 74 of the HPD line 72 is connected to a pin 19 of the HDMI terminal of the source apparatus, and a sync-side terminal 76 of the HPD line 72 is connected to a pin 19 of the HDMI terminal of the sync apparatus.

In the source apparatus, the connection point Q1 which connects the pull-up resistor 21 to the AC coupling capacitor 13 as described above is connected to the pin 14 of the HDMI terminal, and the connection point Q2 which connects the pull-down resistor 31 to the AC coupling capacitor 14 as described above is connected to the pin 19 of the HDMI terminal. On the other hand, in the sync apparatus, the connection point Q3 which connects the pull-up resistor 51 to the AC coupling capacitor 43 as described above is connected to the pin 14 of the HDMI terminal, and the connection point Q4 which connects the choke coil 61 to the AC coupling capacitor 44 as described above is connected to the pin 19 of the HDMI terminal.

Next, operation of a LAN communication using the high-speed data line interfaces configured as described above will be described.

In the source apparatus, the transmission signal (transmission data) SG11 is supplied to an input side of the LAN signal transmission circuit 11, and the LAN signal transmission circuit 11 outputs a differential signal (positive output signal or a negative output signal) corresponding to the transmission signal SG11. Then, the differential signal output from the LAN signal transmission circuit 11 is supplied to the connection points P1 and P2, and transmitted to the sync apparatus through a pair of lines (the reserved line 71 and the HPD line 72) of the HDMI cable.

Furthermore, in the sync apparatus, the transmission signal (transmission data) SG17 is supplied to an input side of the LAN signal transmission circuit 41, and the LAN signal transmission circuit 41 outputs a differential signal (a positive output signal or a negative output signal) corresponding to the transmission signal SG17. Then, the differential signal output from the LAN signal transmission circuit 41 is supplied to the connection points P3 and P4, and transmitted to the source apparatus through the pair of lines (the reserved line 71 and the HPD line 72) of the HDMI cable.

Moreover, in the source apparatus, since an input side of the LAN signal reception circuit 15 is connected to the connection points P1 and P2, as the signal SG12 output from the LAN signal reception circuit 15, an addition signal is obtained by adding a transmission signal corresponding to the differential signal (current signal) output from the LAN signal transmission circuit 11 to a reception signal corresponding to the differential signal transmitted from the sync apparatus as described above. The subtracting circuit 16 subtracts the transmission signal SG11 from the signal SG12 output from the LAN signal reception circuit 15. Therefore, the signal SG13 output from the subtracting circuit 16 corresponds to the transmission signal (transmission data) SG17 of the sync apparatus.

Furthermore, in the sync apparatus, since an input side of the LAN signal reception circuit 45 is connected to the connection points P3 and P4, as the output signal SG18 of the LAN signal reception circuit 45, an addition signal is obtained by adding a transmission signal corresponding to the differential signal (current signal) output from the LAN signal transmission circuit 41 to a reception signal corresponding to the differential signal transmitted from the source apparatus as described above. The subtracting circuit 46 subtracts the transmission signal SG17 from the signal SG18 output from the LAN signal reception circuit 45. Therefore, the signal SG19 output from the subtracting circuit 46 corresponds to the transmission signal (transmission data) SG11 of the source apparatus.

As described above, a bidirectional LAN communication can be performed between the high-speed data line interface of the source apparatus and the high-speed data line interface of the sync apparatus.

Note that, in FIG. 8, the HPD line 72 performs the LAN communication as described above, and is further used to transmit information representing that the HDMI cable is connected to the sync apparatus in a DC bias level to the source apparatus. Specifically, when the HDMI cable is connected to the sync apparatus, the resistors 62 and 63 and the choke coil 61 included in the sync apparatus bias the HPD line 72 so that approximately 4 V is attained through the pin 19 of the HDMI terminal. The source apparatus extracts the DC bias of the HPD line 72 using the lowpass filter constituted by the resistor 32 and the capacitor 33, and compares the DC bias with the reference voltage Vref2 (1.4 V, for example) using the comparator 34.

A voltage of the pin 19 of the HDMI terminal of the source apparatus is lower than the reference voltage Vref2 due to the presence of the pull-down resistor 31 when the HDMI cable is not connected to the sync apparatus, and on the other hand, is higher than the reference voltage Vref2 when the HDMI cable is not connected to the sync apparatus. Accordingly, the signal SG15 output from the comparator 34 is in a high level when the HDMI cable is connected to the sync apparatus, and otherwise, in a low level. Therefore, the control unit (CPU) of the source apparatus can recognize whether the HDMI cable is connected to the sync apparatus in accordance with the signal SG15 output from the comparator 34.

Furthermore, in FIG. 8, the apparatuses connected to opposite ends of the HDMI cable have functions of recognizing whether the other apparatus is capable of performing a LAN communication (hereinafter referred to as an "e-HDMI compliant apparatus") or not capable of performing the LAN communication (hereinafter referred to as an "e-HDMI noncompliant apparatus").

As described above, the source apparatus pulls up (+5 V) the reserved line 71 using the resistor 21, and the sync apparatus pulls down the reserved line 71 using the resistor 51. The resistors 21 and 51 are not included in e-HDMI noncompliant apparatuses.

As described above, in the source apparatus, the comparator 24 compares a DC potential of the reserved line 71 which passes the lowpass filter constituted by the resistor 22 and the capacitor 23 with the reference voltage Vref1. When the sync apparatus is an e-HDMI compliant apparatus and includes the pull-up resistor 51, a voltage of the reserved line 71 is 2.5 V. However, when the sync apparatus is e-HDMI noncompliant apparatus and does not include the pull-up resistor 51, the voltage of the reserved line 71 becomes 5 V due to the presence of the pull-up resistor 21.

Therefore, by setting the reference voltage Vref1 to 3.75 V, the signal SG14 output from the comparator 24 becomes a low level when the sync apparatus is an e-HDMI compliant apparatus, and otherwise, becomes a high level. Accordingly, the control unit (CPU) of the source apparatus can recognize whether the sync apparatus is an e-HDMI compliant apparatus in accordance with the signal SG14 output from the comparator 24.

Similarly, as described above, in the sync apparatus, the comparator 54 compares a DC potential of the reserved line 71 which passes the lowpass filter constituted by the resistor 52 and the capacitor 53 with the reference voltage Vref3. When the source apparatus is an e-HDMI compliant apparatus and includes the pull-up resistor 21, a voltage of the reserved line 71 is 2.5 V. However, when the source apparatus is e-HDMI noncompliant apparatus and does not include the pull-up resistor 21, the voltage of the reserved line 71 becomes 0 V due to the presence of the pull-down resistor 51.

Therefore, by setting the reference voltage Vref3 to 1.25 V, the signal SG16 output from the comparator 54 becomes a high level when the source apparatus is an e-HDMI compliant apparatus, and otherwise, becomes a low level. Accordingly, the control unit (CPU) of the sync apparatus can recognize whether the source apparatus is an e-HDMI compliant apparatus in accordance with the signal SG16 output from the comparator 54.

According to the configuration examples shown in FIG. 8, in an interface which performs transmission of video data and audio data, exchange and authentication of connection apparatus information, transmission of apparatus control data, and a LAN communication using one HDMI cable, since the LAN communication is performed through a pair of differential transmission paths as a bidirectional communication and a connection state of the interface is notified using a DC (direct current) bias potential of at least one of the transmission paths, spatial separation can be physically realized without using the SCL line and the SDA line in the LAN communication. As a result, a circuit for the LAN communication can be formed irrespective of electric specification defined for a DDC, and a stable and reliable LAN communication can be realized with low cost.

Note that the pull-up resistor 21 shown in FIG. 8 may be included in the HDMI cable instead of the source apparatus. In such a case, terminals of the pull-up resistor 21 are connected to, among lines included in the HDMI cable, the reserved line 71 and a line (signal line) connected to the power supply (power supply potential), respectively.

Furthermore, the pull-up resistor 51 and the resistor 63 may be included in the HDMI cable instead of the sync apparatus. In such a case, terminals of the pull-up resistor 51 are connected to, among the lines included in the HDMI cable, the reserved line 71 and a line (ground line) connected to the ground (reference potential), respectively. Moreover, terminals of the resistor 63 are connected to, among the lines included in the HDMI cable, the HPD line 72 and the line (ground line) connected to the ground (reference potential), respectively.

In the AV system 100 shown in FIG. 1, when the video camera recorder 200 is reproduced, content data (image data and audio data) reproduced from the memory card 216 or the recording medium 218 is transmitted from the system control CPU 220 to the HDMI transmission unit 202. Then, the content data is transmitted from the HDMI transmission unit 202 through the TMDS line of the HDMI cable 701 to the HDMI reception unit 302 of the television receiver 300.

In the television receiver 300, the video data received using the HDMI reception unit 302 is supplied to the video/graphic processing circuit 314. Furthermore, the audio data received using the HDMI reception unit 302 is supplied to the audio processing circuit 317. By this, a reproduction image of the video camera recorder 200 is displayed on the display panel 316, and reproduction audio of the video camera recorder 200 is output from the speaker 319.

Furthermore, in the AV system 100 shown in FIG. 1, processing information used to perform display processing in synchronization with the reproduction content data is transmitted from the video camera recorder 200 to the television receiver 300. In the video camera recorder 200, the processing information is transmitted from the system control CPU 220 through the Ethernet interface 236 to the high-speed data line interface 203. Then, the processing information is transmitted from the high-speed data line interface 203 through the bidirectional communication path included in the HDMI cable 701 to the high-speed data line interface 303 of the television receiver 300.

Here, information representing display content such as information on a shooting location, information on a shooting date and time, and the like included in the processing information is recorded in the memory card 216 and the recording medium 218 in the video camera recorder 200 so as to be associated with corresponding content data. For example, the shooting date and time is automatically recorded, and the shooting location, a memo, and the like are recorded through inputting operation performed by the user. The system control CPU 220 reads the information representing the display content such as the information on the shooting location, information on the shooting date and time, and the like so as to generate processing information used to perform display processing in synchronization with the content data described above.

The transmission of the processing information from the video camera recorder 200 to the television receiver 300 is performed before the reproduction content data described above is transmitted from the video camera recorder 200 to the television receiver 300, for example. In the television receiver 300, the processing information received using the high-speed data line interface 303 is supplied to the CPU 331 through the Ethernet interface 336, and stored in the DRAM 333, for example. As described above, the index information such as an index number has been added to the processing information for each unit of processing.

On the other hand, index information corresponding to the index information added to the processing information has been added to the content data (image data and audio data) received using the HDMI reception unit 302 when the processing using the processing information is performed for each unit of processing. The index information added to the content data is extracted using the HDMI reception unit 302 and transmitted to the CPU 331.

Here, a method for adding the index information to the content data will be described.

(1) An existing Vendor Specific InfoFrame packet is used.

FIG. 9 shows a configuration of the Vendor Specific InfoFrame packet. The Vendor Specific InfoFrame packet is included in the data island period described above. Using "Vendor Specific Payload", information identifying the index information and the index information are transmitted.

(2) An extended definition is assigned to existing "Format", an existing packet, such as a General Control packet, which has a number of bits which have not been used is used.

FIG. 10(*a*) shows a data configuration of a header of the General Control packet, and FIG. 10 (*b*) shows a data configuration of a General Control sub-packet. The General Control packet is also included in the data island period described above. A definition of the index information may be assigned to, for example, SB3 or after SB3 to which no definition has been assigned.

(3) A new packet is defined.

FIG. 11(*a*) shows an example of a data configuration of a header of an additional InfoFrame packet, and FIG. 11(*b*) shows a data configuration of InfoFrame packet content. The additional InfoFrame packet is also included in the data island period described above. Using a content region of the additional InfoFrame packet, information identifying the index information and the index information are transmitted.

Figures 12, 13:
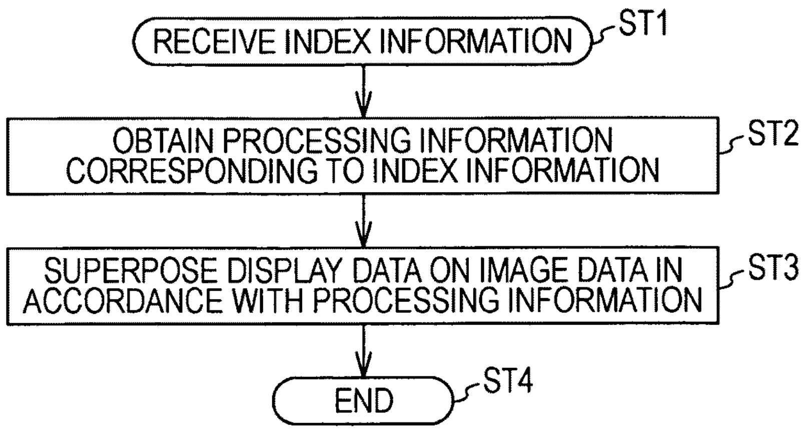
FIG. 12 is a flowchart illustrating a processing procedure performed by a CPU when index information is transmitted from the HDMI reception unit in the television receiver.
FIGS. 13(*a*) and 13(*b*) are diagrams illustrating processing information transmitted from the video camera recorder to the television receiver through a bidirectional communication path and a timing relationship between an index number added to content data transmitted from the video camera recorder to the television receiver through the TMDS line and a display image.

When the index information is transmitted from the HDMI reception unit 302 as described above, the CPU 331 performs a processing operation in accordance with a procedure shown in a flowchart of FIG. 12. The CPU 331 constitutes an information processing unit.

Specifically, the CPU 331 receives index information from the HDMI reception unit 302 in step ST1, and the process proceeds to step ST2. In step ST2, the CPU 331 performs processing for searching the DRAM 333 for certain processing information of a specific processing unit to which index information corresponding to the index information received in step ST1 is assigned, and obtains the processing information.

Then, in step ST3, the CPU 331 generates display data in accordance with the processing information obtained in step ST2, i.e., information on a shooting location, a shooting date and time and the like included in the processing information. The video/graphic processing circuit 314 superposes the display data on image data. In this way, the information on the shooting location, the shooting date and time and the like corresponding to an image is superposed on an image displayed on the display panel 316. After the operation in step ST3, the CPU 331 terminates the processing in step ST4.

Next, an example of display processing performed by the television receiver 300 will be described. FIG. 13(*a*) shows processing information which is transmitted from the video camera recorder 200 to the television receiver 300 using the bidirectional communication path. Index numbers 1 to 3 are assigned to first to third units of processing, respectively. Note that each of the index numbers 1 to 3 is also information representing that corresponding processing information is used to perform display processing. Display content in accordance with display processing corresponding to the index number 1 is "December 5, Abiko". Display content in accordance with display processing corresponding to the index number 2 is "July 8, Naha". Display content in accordance with display processing corresponding to the index number 3 is "March 30, Shinagawa".

FIG. 13(*b*) shows timing relationships between index numbers which have been assigned to content data transmitted from the video camera recorder 200 to the television receiver 300 through the TMDS line and display images. The index number 1 is assigned to image data representing an image A. The index number 2 is assigned to image data representing an image B. The index number 3 is assigned to image data representing an image C. Note that each of the images A, B, and C is a predetermined image corresponding to a still image or a moving image.

Figure 14:
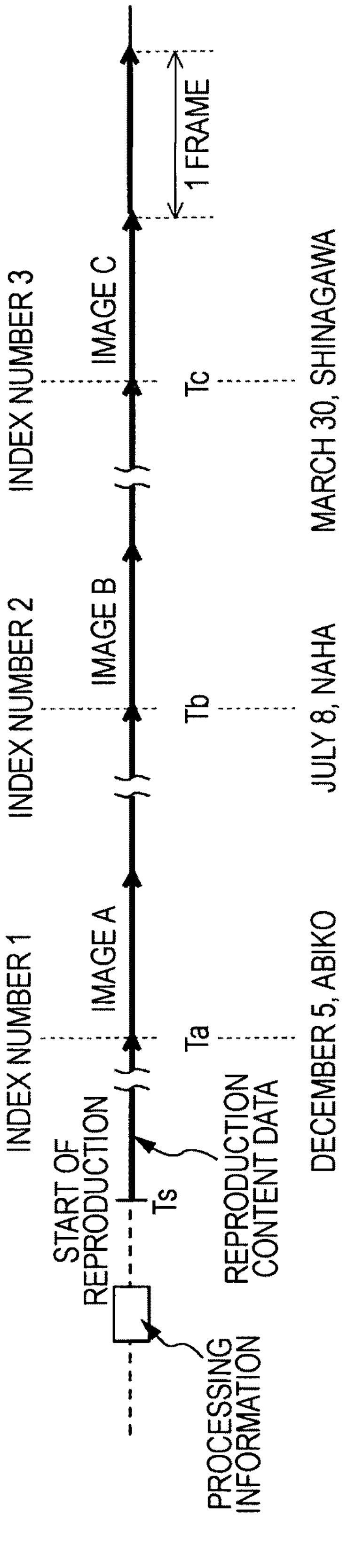
FIG. 14 is a diagram illustrating timings when display processes corresponding to index numbers 1 to 3 are performed in the television receiver.

FIG. 14 shows a timing of the display processing of the index number 1 to 3 of the television receiver 300. The processing information is transmitted before reproduction content data is reproduced (a time point Ts).

The index number 1 has been assigned to the image data representing the image A. Therefore, the television receiver 300 performs display processing corresponding to the index number 1 at a timing when the image data is received (a time point Ta) so that information representing a date and time and a location, such as "December 5, Abiko" is superposed on the image A.

Furthermore, the index number 2 has been assigned to the image data representing the image B. Therefore, the television receiver 300 performs display processing corresponding to the index number 2 at a timing when the image data is received (a time point Tb) so that information representing a date and time and a location, such as "July 8, Naha" is superposed on the image B.

Furthermore, the index number 3 is assigned to the image data representing the image C. Therefore, the television receiver 300 performs display processing corresponding to the index number 3 at a timing when the image data is received (a time point Tc) so that information representing a date and time and a location, such as "July 8, Shinagawa" is superposed on the image B.

Figure 15:
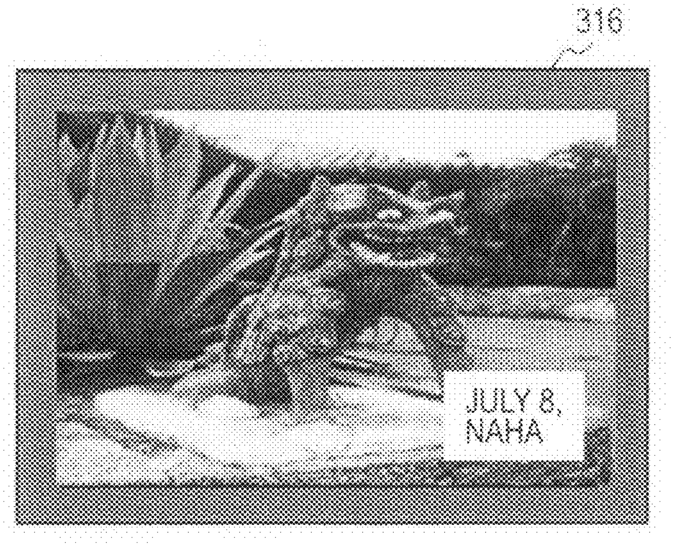
FIG. 15 is a diagram illustrating a display example when information on a date and time and a place is superposed on an image displayed in a display panel of the television receiver.

FIG. 15 shows, as an example of display on the display panel 316 of the television receiver 300, a display example in a case where the information representing the date and time and the location shown as "July 8, Naha" is superposed on the image B as described above.

As described above, in the AV system 100 shown in FIG. 1, when the video camera recorder 200 performs reproducing processing, reproduction content data (image data and audio data) is transmitted from the video camera recorder 200 to the television receiver 300 through the TMDS line included in the HDMI cable 701. Furthermore, in the AV system 100 shown in FIG. 1, processing information used for display processing performed in synchronization with the reproduction content data is transmitted from the video camera recorder 200 to the television receiver 300 through the bidirectional communication path constituted by the reserved line and the HPD line included in the HDMI cable 701 before the reproduction content data is transmitted.

Index information such as an index number is added to the processing information for each unit of processing. Furthermore, index information such as an index number corresponding to the index information assigned to the processing information is assigned to the reproduction content data (image data and audio data) at a timing when the processing information is processed for each unit of processing. Then, the television receiver 300 performs display processing using display content information corresponding to the index information at a timing when the index information is assigned to the received content data.

Accordingly, in the AV system 100 shown in FIG. 1, the television receiver 300 can easily perform processing for displaying information on a shooting location, a shooting date and time and the like in synchronization with display of reproduction content data (image data and audio data) transmitted from the video camera recorder 200.

Note that, in the AV system 100 shown in FIG. 1, in the television receiver 300, if index information is assigned to the content data received using the HDMI reception unit 302, the index information is transmitted from the HDMI reception unit 302 to the CPU 331. Then, the CPU 331 obtains processing information corresponding to the index information from the DRAM 333, and generates display data in accordance with the processing information. Then, the video/graphic processing circuit 314 superposes the display data on image data.

Specifically, in the television receiver 300, if it is determined that the index information has been assigned to the content data received using the HDMI reception unit 302, the CPU 331 starts display processing thereafter. In this case, for example, if index information extracted next using the HDMI reception unit 302 can be predicted, display data can be generated in advance. Accordingly, in the television receiver 300 can immediately perform display processing in synchronization with the reproduction content data transmitted from the video camera recorder 200.

Note that, information (hereinafter referred to as "predicted next index information") representing index information predicted to be added to production content data and transmitted next may be added to the reproduction content data and may be transmitted from the video camera recorder 200 to the television receiver 300.

Figure 16:
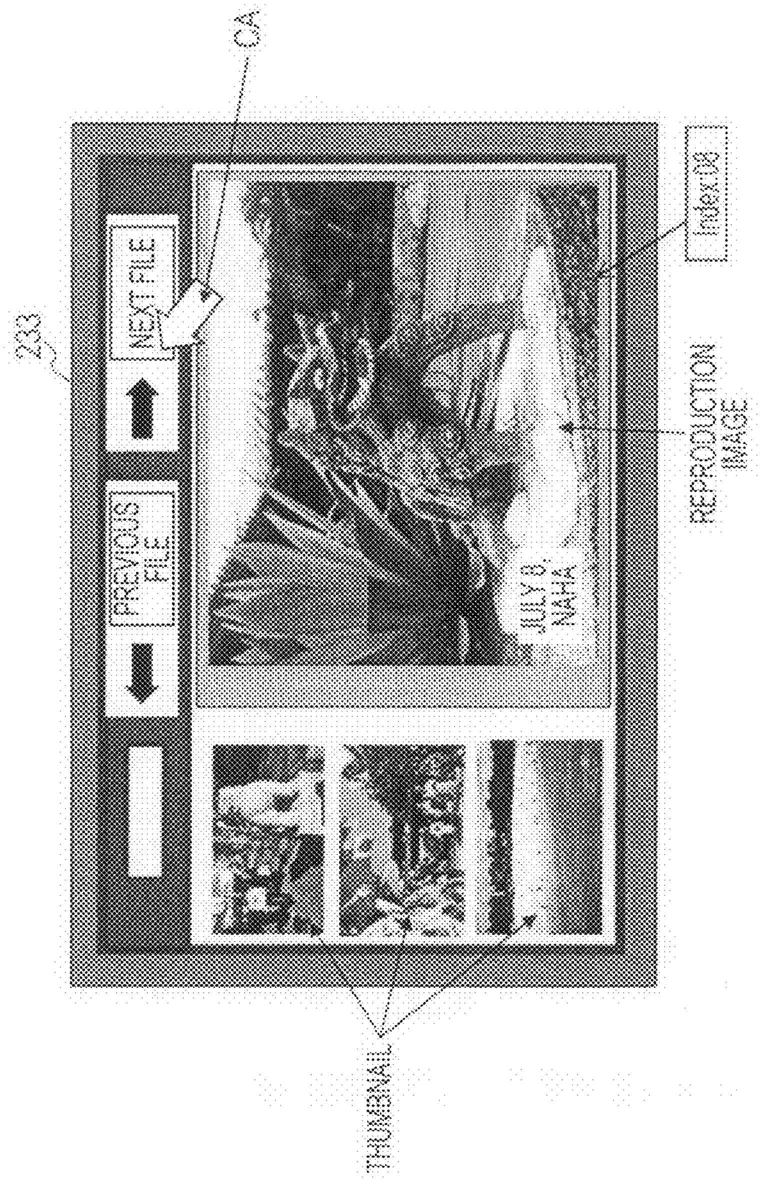
FIG. 16 is a diagram illustrating a display example of an LCD panel when the video camera recorder performs reproducing processing (a cursor is located on a selection button "next file").

For example, FIG. 16 shows a display example of the LCD panel 233 when the video camera recorder 200 performs reproducing processing. In this display example, in addition to a reproduction image, selection buttons represented by "next file" and "previous file" for selecting a reproduction file and thumbnails corresponding to reproduction files are displayed.

The user can instruct reproduction of a file to be reproduced after a file which is currently reproduced by moving a cursor CA onto the selection button "next file" for a determination operation. Furthermore, the user can instruct reproduction of a file reproduced before the file which is currently reproduced by moving a cursor CA onto the selection button "previous file" for a determination operation. Moreover, the user can instruct reproduction of a file corresponding to a certain thumbnail by moving a cursor CA onto the certain thumbnail for a determination operation.

When the cursor CA is located on the selection button "next file" as shown in FIG. 16, for example, the video camera recorder 200 transmits predicted next index information to the television receiver 300 as below. In this case, first, predicted next index information representing index information transmitted by being added to reproduction content data of the next file is added to reproduction content data of a file which is currently reproduced and is transmitted. Next, predicted next index information representing index information transmitted by being added to reproduction content data of a previous file is added to the reproduction content data of the file which is currently reproduced and is transmitted.

For example, when it is assumed that index information corresponding to a current reproduction file is "08", index information corresponding to the next file is "09", and index information corresponding to a previous file is "07", transmission processing is performed as below. That is, predicted next index information to be transmitted first represents "09", and predicted next index information to be transmitted next represents "07".

Furthermore, when the cursor CA is located on the selection button "previous file", predicted next index information is transmitted to the television receiver 300 as below. In this case, first, the predicted next index information representing the index information transmitted by being added to the reproduction content data of the previous file is added to the reproduction content data of the file which is currently reproduced and is transmitted. Next, the predicted next index information representing index information transmitted by being added to the reproduction content data of the next file is added to the reproduction content data of the file which is currently reproduced and is transmitted.

Figures 17, 18:
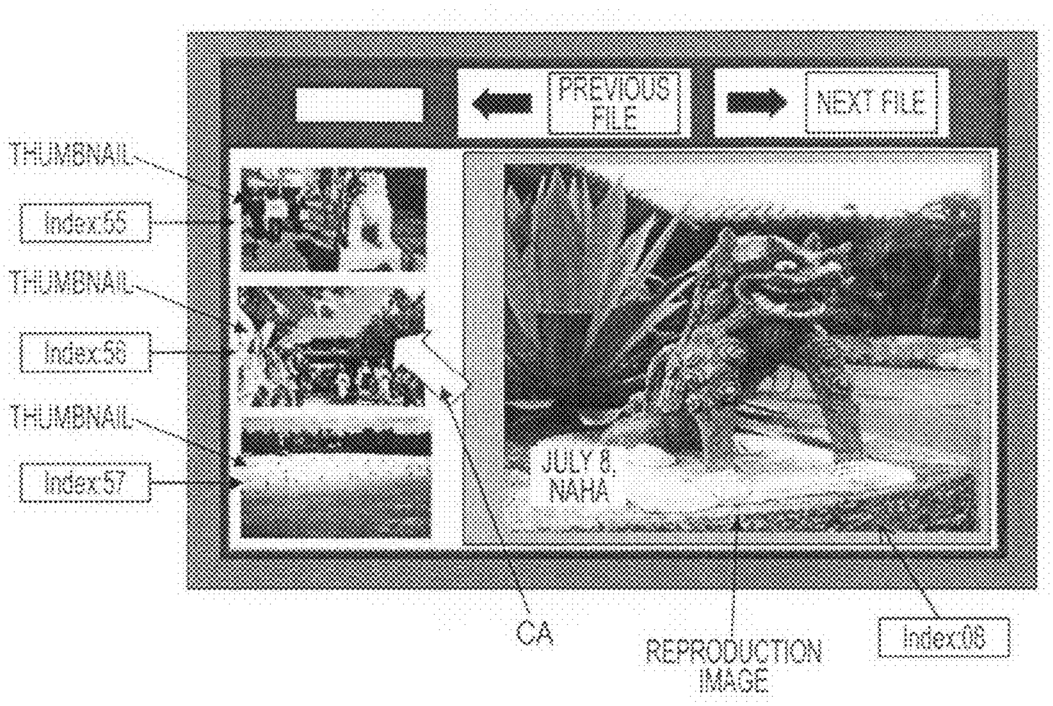
FIG. 17 is a diagram illustrating a display example of an LCD panel when the video camera recorder is reproduced (a cursor is on a thumbnail).
FIG. 18 is a diagram illustrating an example of a data configuration of a new InfoFrame packet used for transmission of index information and predicted next index information.

Furthermore, for example, when the cursor CA is located on a thumbnail corresponding to a reproduction file represented by index information "56" as shown in FIG. 17, the video camera recorder 200 transmits predicted next index information to the television receiver 300 as below. In this case, predicted next index information representing the index information "56" is added to the reproduction content data of the file which is currently reproduced and is transmitted. Next, predicted next index information representing index information "55" and predicted next index information representing index information "57" are added to the reproduction content data of the file which is currently reproduced and are transmitted.

The transmission of the index information and the predicted next index information can be performed, as described above, by defining a new InfoFrame packet (refer to FIG. 11). For example, when the index information is effective, bit[7] of Data Byte1 is set to 1, whereas when the predicted next index information is to be transmitted, bit[0] of Data Byte1 is set to 1. Furthermore, for example, when the predicted next index information is to be transmitted, a priority level is shown in bit[7:0] of Data Byte2. Then, the index information (index number) is stored in Data Byte3 and after Data Byte 3.

FIG. 18 shows an example of the new InfoFrame. In the InfoFrame packet, since bit[7] of Data Byte1 corresponds to "1", it is recognized that the index information is effective. Furthermore, since bit[0] of Data Byte1 corresponds to "1", transmission of the predicted next index information is recognized. Moreover, it is recognized that a second rank is assigned to the predicted next index information as a priority level due to bit[7:0] of Data Byte2.

When, in addition to the index information, the predicted next index information is added to the reproduction content data transmitted from the video camera recorder 200 to the television receiver 300 as described above, in the television receiver 300, the index information and the predicted next index information are extracted using the HDMI reception unit 302 and are transmitted to the CPU 331.

Figure 19:
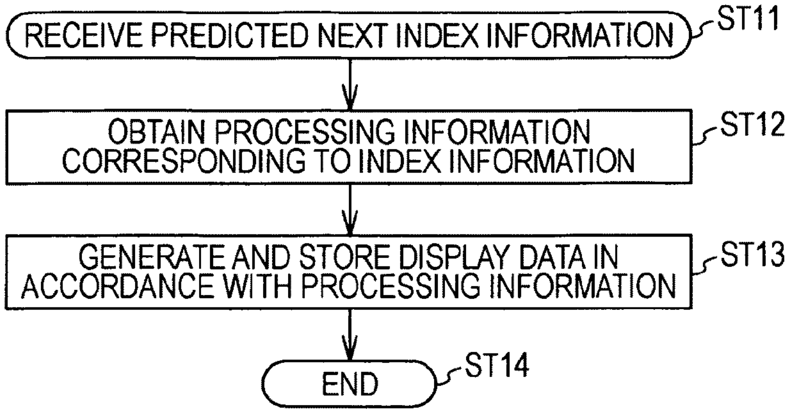
FIG. 19 is a flowchart illustrating a processing procedure performed by the CPU when the predicted next index information is transmitted from the HDMI reception unit of the television receiver.

When the predicted next index information is transmitted from the HDMI reception unit 302, the CPU 331 performs a processing operation in accordance with a procedure shown in a flowchart of FIG. 19, for example.

Specifically, the CPU 331 receives the predicted next index information from the HDMI reception unit 302 in step ST11, and the process proceeds to step ST12. In step ST12, the CPU 331 performs processing for searching the DRAM 333 for certain processing information of a specific unit of processing to which index information corresponding to the predicted next index information received in step ST11 is assigned, and obtains the processing information.

Then, in step ST13, the CPU 331 generates display data in accordance with the processing information obtained in step ST12, i.e., information on a shooting location, a shooting date and time and the like included in the processing information and stores the display data in the DRAM 333. After the operation in step ST13, the CPU 331 terminates the processing in step ST14.

Figure 20:
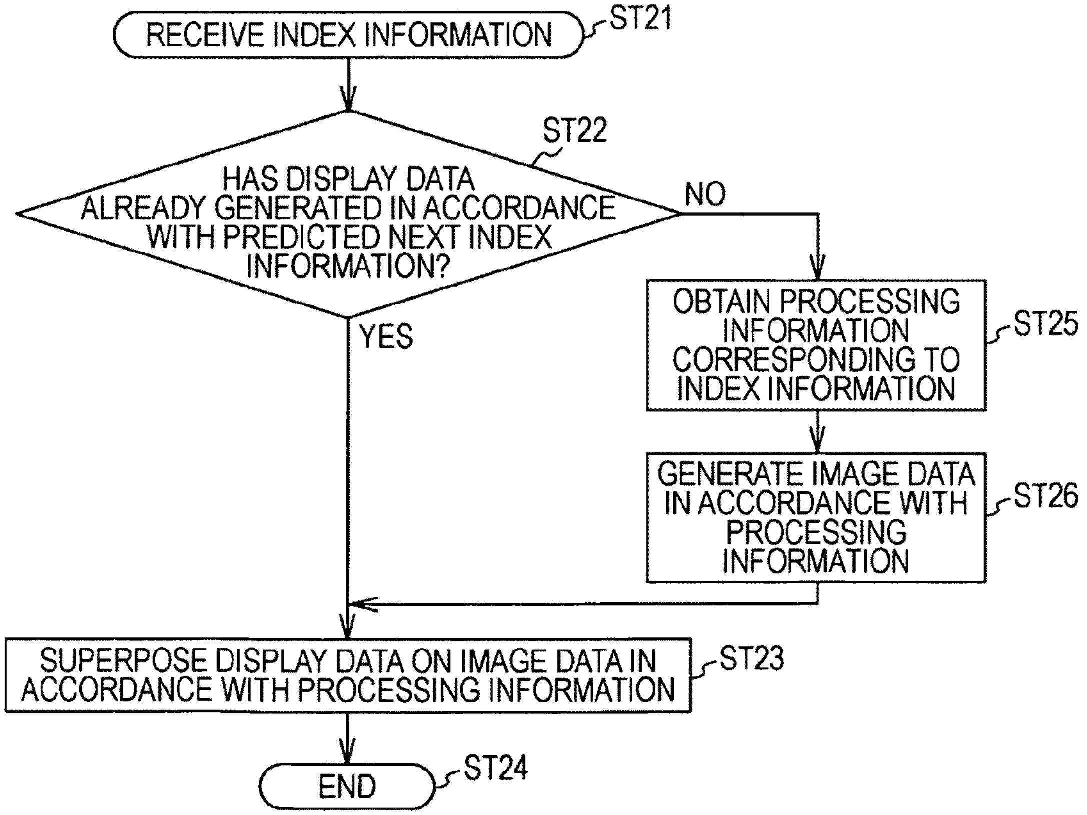
FIG. 20 is a flowchart illustrating a processing procedure performed by the CPU when the index information is transmitted from the HDMI reception unit of the television receiver.

Furthermore, when the index information is transmitted from the HDMI reception unit 302, the CPU 331 performs a processing operation in accordance with a procedure shown in a flowchart of FIG. 20, for example.

Specifically, the CPU 331 receives the index information from the HDMI reception unit 302 in step ST21, and process proceeds to step ST22. In step ST22, the CPU 331 determines whether corresponding display data has been generated in accordance with the predicted next index information.

When the display data has been already generated, the CPU 331 proceeds to step ST23 where the video/graphic processing circuit 314 superposes the display data on image data. By this, information on a shooting location, a shooting date and time and the like corresponding to a certain image is superposed on the image displayed on the display panel 316. After the operation in step ST23, the CPU 331 terminates the processing in step ST24.

When the display data has not been generated in step ST22, the CPU 331 proceeds to step ST25. In step ST25, the CPU 331 performs processing for searching the DRAM 333 for certain processing information of a specific processing unit to which index information corresponding to the index information received in step ST21 is assigned, and obtains the processing information.

Then, in step ST26, the CPU 331 generates display data in accordance with the processing information obtained in step ST25, i.e., information on the shooting location, the shooting date and time and the like included in the processing information. Then, in step ST23, the CPU 331 superposes the display data on image data using the video/graphic processing circuit 314, and thereafter, in step ST24, the CPU 331 terminates the processing. In this way, the information representing the shooting location, the shooting date and time and the like corresponding to a certain image is superposed on the image displayed on the display panel 316.

Figure 21:
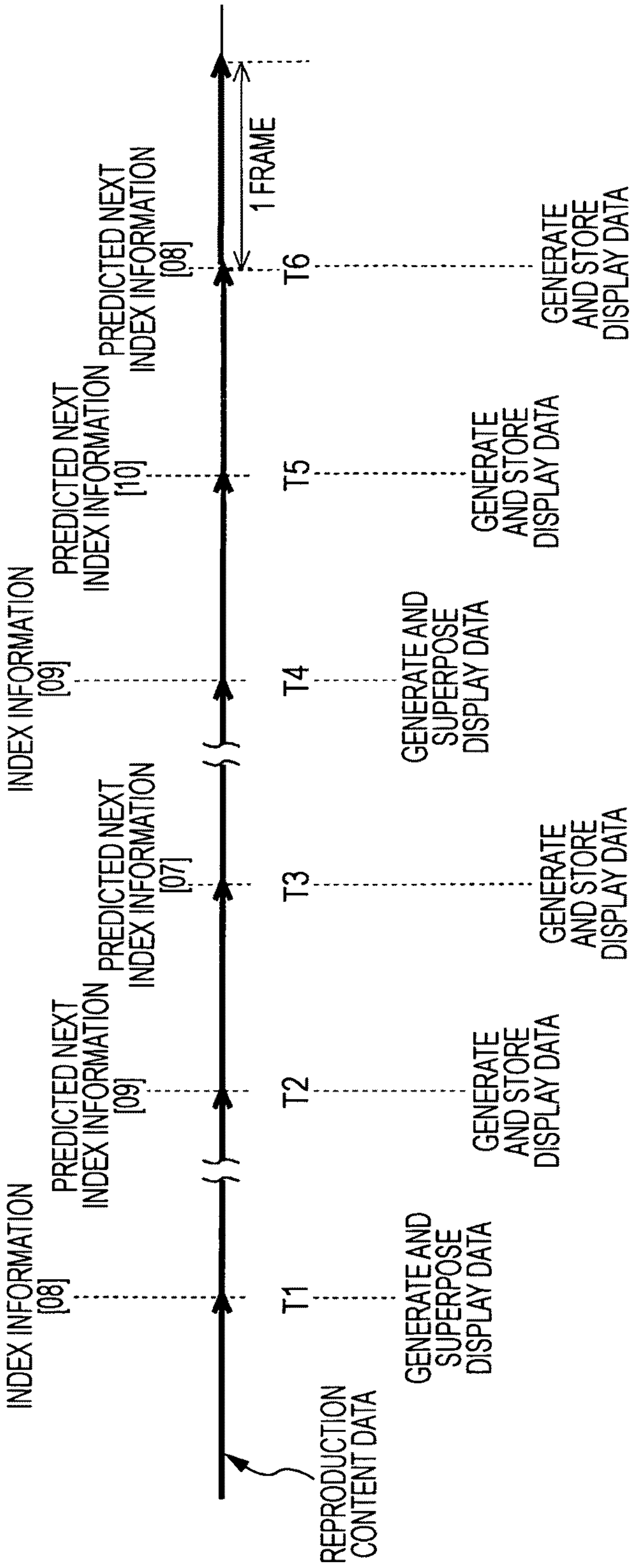
FIG. 21 is a diagram illustrating an example of a processing operation performed by the television receiver when the index information and the predicted next index information are transmitted from the video camera recorder.

FIG. 21 shows an example of a processing operation of the television receiver 300 when the index information and the predicted next index information are transmitted from the video camera recorder 200 to the television receiver 300. In this example, as shown in FIG. 16, the cursor CA is located on the selection button "next file".

At a timing (T1) when index information [08] transmitted from the video camera recorder 200 is received, processing information corresponding to the index information [08] is obtained from the DRAM 333, display data is generated in accordance with the processing information, and the display data is superposed on image data.

Thereafter, at a timing (T2) when predicted next index information [09] is received, processing information corresponding to index information [09] is obtained from the DRAM 333, and display data is generated in accordance with the processing information and is stored in the DRAM 333. Furthermore, at a timing (T3) when predicted next index information [07] is received, processing information corresponding to index information [07] is obtained from the DRAM 333, and display data is generated in accordance with the processing information and is stored in the DRAM 333.

Thereafter, at a timing (T4) when the index information [09] transmitted from the video camera recorder 200 is received, the display data corresponding to the index information [09] has been generated in accordance with the predicted next index information [09] and is stored in the DRAM. Therefore, at the reception timing (T4), the display data is simply obtained from the DRAM 333 and is superposed on image data.

At a timing (T5) when predicted next index information [10] is received and a timing (T6) when predicted next index information [08] is received, similarly, display data is generated and stored in order to stand by reception of subsequent index information.

As described above, the television receiver 300 can generate display data in advance in accordance with corresponding processing information since predicted next index information is transmitted from the video camera recorder 200 to the television receiver 300. By this, the television receiver 300 can immediately perform display processing in synchronization with reproduction content data transmitted from the video camera recorder 200.

Figure 22:
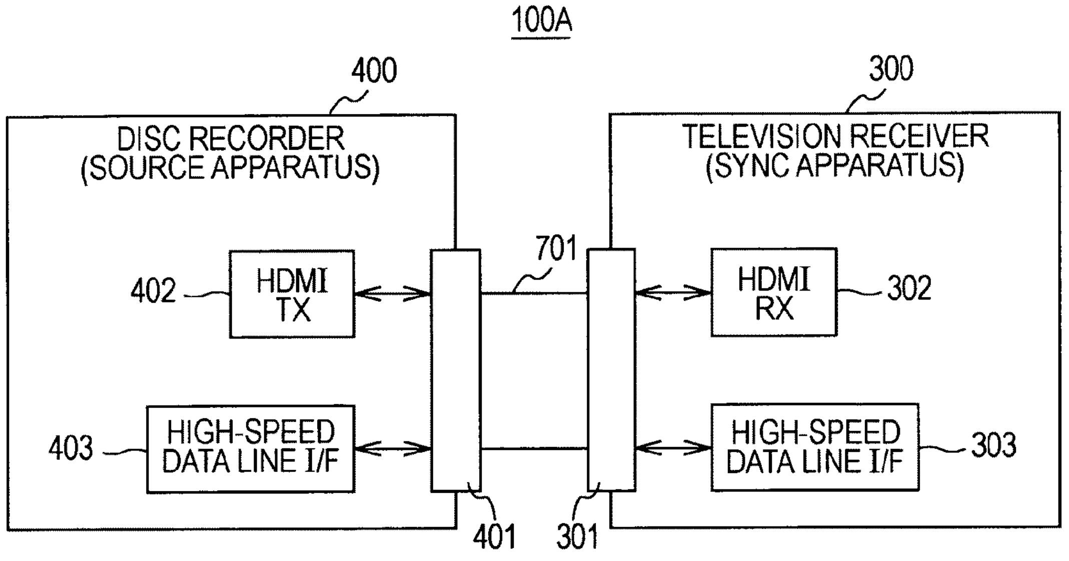
FIG. 22 is a block diagram illustrating a configuration example of an AV system according to another embodiment of the present invention.

Next, another embodiment of the present invention will be described. FIG. 22 shows a configuration example of an AV system 100A according to another embodiment of the present invention. In the AV system 100A, reference numerals the same as those of the AV system 100 shown in FIG. 1 are assigned to components the same as those of the AV system 100, and descriptions thereof are omitted where appropriate.

The AV system 100A includes a disc recorder 400 and a television receiver 300. The disc recorder 400 constitutes a source apparatus of an HDMI. The television receiver 300 constitutes a sync apparatus of the HDMI.

The disc recorder 400 is connected to the television receiver 300 through the HDMI cable 701. The disc recorder 400 includes an HDMI transmission unit (HDMI TX) 402 and an HDMI terminal 401 connected to a high-speed data line interface 403. The television receiver 300 includes an HDMI reception unit (HDMI RX) 302 and an HDMI terminal 301 connected to a high-speed data line interface 303. An HDMI cable 701 is connected to the HDMI terminal 401 of the disc recorder 400 at one terminal thereof, and is connected to the HDMI terminal 301 of the television receiver 300 at the other terminal.

In the AV system 100A shown in FIG. 22, reproduction content data (image data and audio data) is transmitted from the disc recorder 400 to the television receiver 300. The content data is transmitted from the HDMI transmission unit 402 of the disc recorder 400 to the HDMI reception unit 302 of the television receiver 300 through a TMDS line included in the HDMI cable 701. In accordance with the content data transmitted from the disc recorder 400, in the television receiver 300, an image is displayed and audio is output. Here, the HDMI cable 701 constitutes a first transmission path. The HDMI transmission unit 402 constitutes a data transmission unit, and the HDMI reception unit 302 constitutes a data reception unit.

Furthermore, in the AV system 100A shown in FIG. 22, the disc recorder 400 transmits information on processing performed in synchronization with the content data, i.e., processing information used to perform audio muting processing (muting setting information, muting cancelling information and the like) in this embodiment to the television receiver 300. The processing information is transmitted from the disc recorder 400 to the television receiver 300 through a bidirectional communication path constituted by a reserved line and an HPD line included in the HDMI cable 701. Here, the bidirectional communication path constitutes a second transmission path. The high speed data line interface 403 of the disc recorder 400 and the high-speed data line interface 303 of the television receiver 300 are interfaces of the bidirectional communication path described above. The high speed data line interface 403 constitutes an information transmission unit, and the high-speed data line interface 303 constitutes an information reception unit.

Index information, i.e., an index number is assigned to the processing information transmitted from the disc recorder 400 to the television receiver 300 for each unit of processing. Then, index information corresponding to the index information added to the processing information is added to the content data transmitted from the disc recorder 400 to the television receiver 300 at a timing when the processing information is processed for each unit of processing.

In the AV system 100A shown in FIG. 22, as described above, audio corresponding to the audio data transmitted from the disc recorder 400 is output to the television receiver 300. In the AV system 100A shown in FIG. 22, in accordance with the index information added to the reproduction content data, audio muting is controlled. For example, at a frame timing when certain index information is added, the audio muting is set or the audio muting is cancelled in accordance with processing information of a unit of processing to which the index information is added.

Note that, in the television receiver 300, when the user is allowed to perform on/off setting of a muting mode and the muting mode is set to an on state, as described above, the audio muting may be controlled on the basis of the index information added to the reproduction content data as described above.

Figure 23:
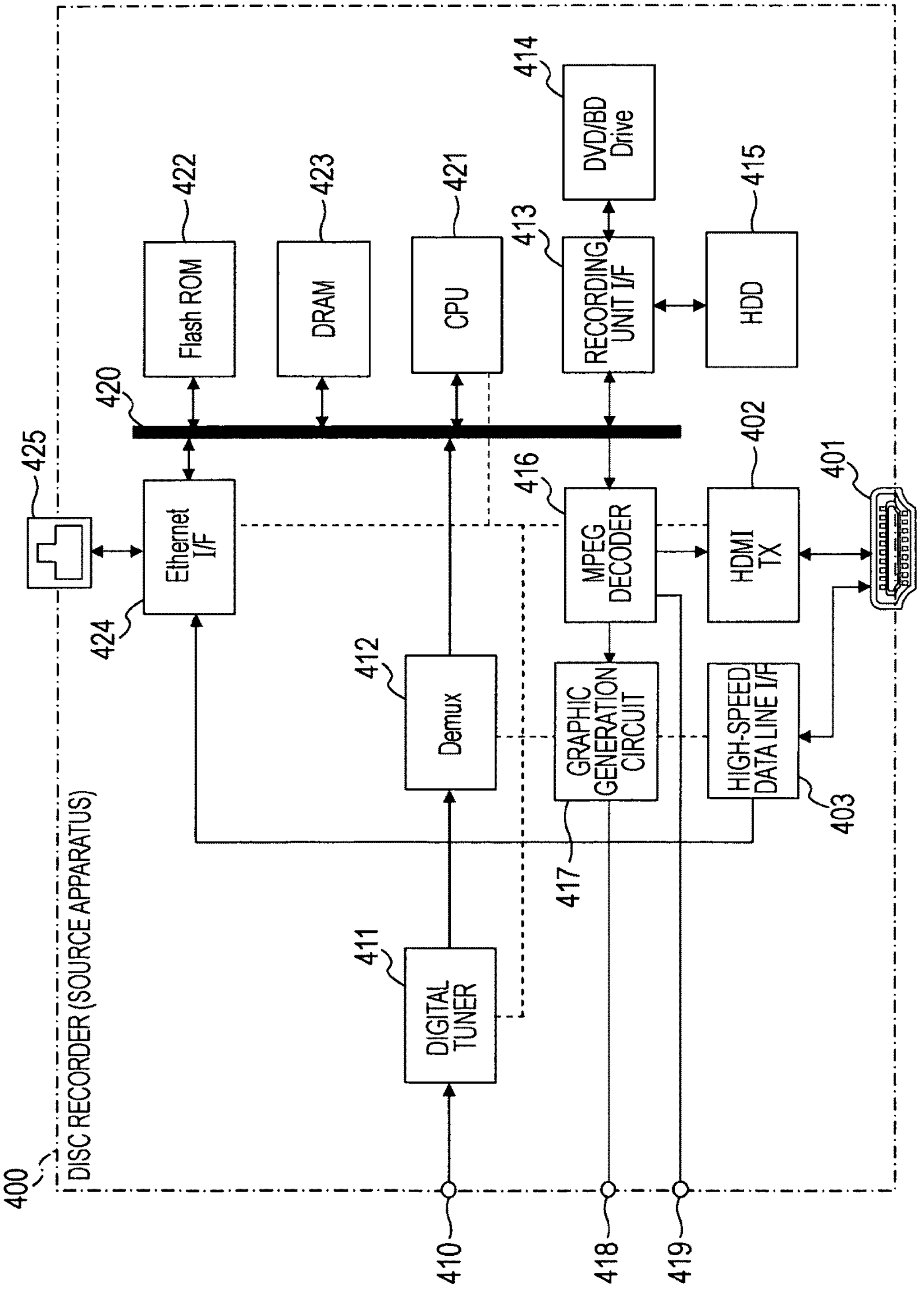
FIG. 23 is a block diagram illustrating a configuration example of a disc recorder (source apparatus) included in the AV system.

FIG. 23 shows a configuration example of the disc recorder 400. The disc recorder 400 includes the HDMI terminal 401, the HDMI transmission unit 402, the high-speed data line interface 403, an antenna terminal 410, a digital tuner 411, a demultiplexer 412, a recording unit interface 413, a DVD/BD drive 414, and an HDD (Hard Disk Drive) 415.

Furthermore, the disc recorder 400 includes an MPEG decoder 416, a graphic generation circuit 417, a video output terminal 418 and an audio output terminal 419, and the disc recorder 400 further includes an internal bus 420, a CPU 421, a flash ROM 422, a DRAM 423, an Ethernet interface (Ethernet I/F) 424, and a network terminal 425.

The antenna terminal 410 is used to input a television broadcasting signal received using a reception antenna (not shown). The digital tuner 411 processes the television broadcasting signal input to the antenna terminal 410 and outputs a predetermined transport stream. The demultiplexer 412 extracts a partial TS (Transport Stream) (a TS packet of video data and a TS packet of audio data) corresponding to a predetermined selected channel from the transport stream obtained using the digital tuner 411.

Furthermore, the demultiplexer 412 extracts PSI/SI (Program Specific Information/Service Information) from the transport stream obtained using the digital tuner 411 and outputs the PSI/SI to the CPU 421. The transport stream obtained using the digital tuner 411 includes a plurality of channels which have been multiplexed with one another. The demultiplexer 412 extracts a partial TS of an arbitrary channel from the transport stream by obtaining information on a packet ID (PID) of the arbitrary channel from the PSI/SI (PAT/PMT).

The CPU 421, the flash ROM 422, the DRAM 423, the demultiplexer 412, the Ethernet interface 424, and the recording unit interface 418 are connected to the internal bus 420. The DVD/BD drive 414 and the HDD 415 are connected to the internal bus 420 through the recording unit interface 413. The DVD/BD drive 414 and the HDD 415 record the partial TS extracted using the demultiplexer 412. Furthermore, each of the DVD/BD drive 414 and the HDD 415 reproduces the partial TS recorded in a recording medium.

The MPEG decoder 416 obtains video data by performing decoding processing on a video PES packet included in the partial TS extracted using the demultiplexer 412 or reproduced using the DVD/BD drive 414 or the HDD 415. Furthermore, the MPEG decoder 416 obtains audio data by performing decoding processing on audio PES packet included in the partial TS.

The graphic generation circuit 417 performs processing for superposing graphic data on the video data obtained using the MPEG decoder 416 where appropriate. The video output terminal 418 outputs the video data supplied from the graphic generation circuit 417. The audio output terminal 419 outputs the audio data obtained using the MPEG decoder 416.

The CPU 421 controls operations of the various units of the disc recorder 400. The flash ROM 422 stores control software and data. The DRAM 423 constitutes a workarea of the CPU 421. The CPU 421 loads the software and the data read from the flash ROM 422 to the DRAM 423 so as to activate the software, and controls the various units of the disc recorder 400.

When reproducing processing is performed using the DVD/BD drive 414 or the HDD 415, the video data and the audio data obtained using the MPEG decoder 416 is supplied to the HDMI transmission unit 401. The HDMI transmission unit 402 supplies image data (video signal) and audio data (audio signal) in a baseband to the HDMI cable through the HDMI terminal 401 using a communication based on the HDMI. Although not described in detail, the HDMI transmission unit 402 is configured similarly to the HDMI transmission unit 202 of the video camera recorder 200 described above (refer to FIGS. 2 and 4).

As described above, the high-speed data line interface 403 is used for a bidirectional communication path constituted by certain lines (the reserved line and the HPD line in this embodiment) of the HDMI cable connected to the HDMI terminal 401. The high-speed data line interface 403 is inserted between the Ethernet interface 424 and the HDMI terminal 401. Note that the Ethernet interface 424 is connected to the network terminal 425. Although not described in detail, the high-speed data line interface is configured similarly to the high-speed data line interface 203 of the video camera recorder 200 described above (refer to FIGS. 2 and 8).

Operation of the disc recorder 400 shown in FIG. 23 will be described.

A television broadcasting signal input from the antenna terminal 410 is supplied to the digital tuner 411. The digital tuner 411 processes the television broadcasting signal so as to extract a predetermined transport stream and supplies the predetermined transport stream to the demultiplexer 412. The demultiplexer 412 extracts partial TSs (a TS packet of video data and a TS packet of audio data) corresponding to a predetermined channel. The partial TSs are supplied through the recording unit interface 413 to the DVD/BD drive 414 or the HDD 415, and are recorded in accordance with a recording instruction issued by the CPU 421.

Furthermore, the partial TSs extracted using the demultiplexer 412 as described above and the partial TSs reproduced using the DVD/BD drive 414 or the HDD 415 are supplied to the MPEG decoder 416. The MPEG decoder 416 performs decoding processing on a video PES packet constituted by the TS packet corresponding to the video data so as to obtain the video data. After the graphic generation circuit 417 performs processing for superposing graphic data on the video data, the video data is supplied to the video output terminal 418. Furthermore, the MPEG decoder 416 performs decoding processing on an audio PES packet constituted by the TS packet corresponding to the audio data so as to obtain the audio data. The audio data is supplied to the audio output terminal 419.

The image data and the audio data which correspond to the partial TSs reproduced using the DVD/BD drive 414 or the HDD 415 and which are obtained using the MPEG decoder 416 are supplied to the HDMI transmission unit 402, and further supplied to the HDMI cable connected to the HDMI terminal 401.

In the AV system 100A shown in FIG. 22, when the disc recorder 400 performs reproducing processing, content data (image data and audio data) reproduced using the DVD/BD drive 414 or the HDD 415 is supplied from the MPEG decoder 416 to the HDMI transmission unit 402. Then, the content data is supplied from the HDMI transmission unit 402 to the HDMI reception unit 302 of the television receiver 300 through the TMDS line of the HDMI cable 701.

In the television receiver 300 (refer to FIG. 3), the video data received using the HDMI reception unit 302 is supplied to a video/graphic processing circuit 314. Furthermore, the audio data received using the HDMI reception unit 302 is supplied to an audio processing circuit 317. By this, an image reproduced by the disc recorder 400 is displayed on a display panel 316 and audio reproduced from the disc recorder 400 is output from a speaker 319.

Moreover, in the AV system 100A shown in FIG. 22, the disc recorder 400 transmits processing information used to perform audio muting processing in synchronization with the reproduction content data described above to the television receiver 300. In the disc recorder 400, the processing information is supplied from the CPU 421 to the high-speed data line interface 403 through the Ethernet interface 424. Then, the processing information is supplied from the high-speed data line interface 403 to the high-speed data line interface 303 of the television receiver 300 through the bidirectional communication path included in the HDMI cable 701.

The transmission of the processing information from the disc recorder 400 to the television receiver 300 is performed before the reproduction content data described above is transmitted from the disc recorder 400 to the television receiver 300, for example. In the television receiver 300, the processing information received using the high-speed data line interface 303 is supplied to a CPU 331 through an Ethernet interface 336, and stored in a DRAM 333, for example. As described above, the index information, for example, an index number has been added to the processing information for each unit of processing.

On the other hand, index information corresponding to the index information added to the processing information has been added to the content data (image data and audio data) received using the HDMI reception unit 302 when the processing using the processing information is performed for each unit of processing. The index information added to the content data is extracted using the HDMI reception unit 302 and transmitted to the CPU 331.

When the index information is supplied from the HDMI reception unit 302 as described above, the CPU 331 obtains processing information of a certain unit of processing corresponding to the index information from the processing information stored in the DRAM 333. Then, in accordance with the obtained processing information, the CPU 331 performs an audio muting processing operation. For example, when the processing information represents audio muting, the CPU 331 controls an audio amplifying circuit 318 so that a muting state is entered. Furthermore, when the processing information represents a normal state, the CPU 331 controls the audio amplifying circuit so as to cancel the muting state.

Next, an example of muting processing in the television receiver 300 will be described. FIG. 24(*a*) shows processing information transmitted from the disc recorder 400 to the television receiver 300 through the bidirectional communication path. Index numbers 1 and 2 are assigned to first and second units of processing, respectively. Note that each of the index numbers 1 and 2 also functions as information representing that the processing information is used to perform muting processing. The processing information corresponding to the index number 1 is "Normal", that is, muting cancelling information. Furthermore, the processing information corresponding to the index number 2 is "Audio Mute", that is, muting setting information.

FIG. 24(*b*) shows the timing relationships between index numbers added to content data transmitted from the disc recorder 400 to the television receiver 300 through the TMDS line and displayed images. An index number 2 is added to image data representing an image A which is an image before audio is changed, for example. An index number 1 is added to image data representing an image B which is an image after the audio is changed. Note that the images A and B correspond to certain frame images which constitute a moving image.

Figure 25:
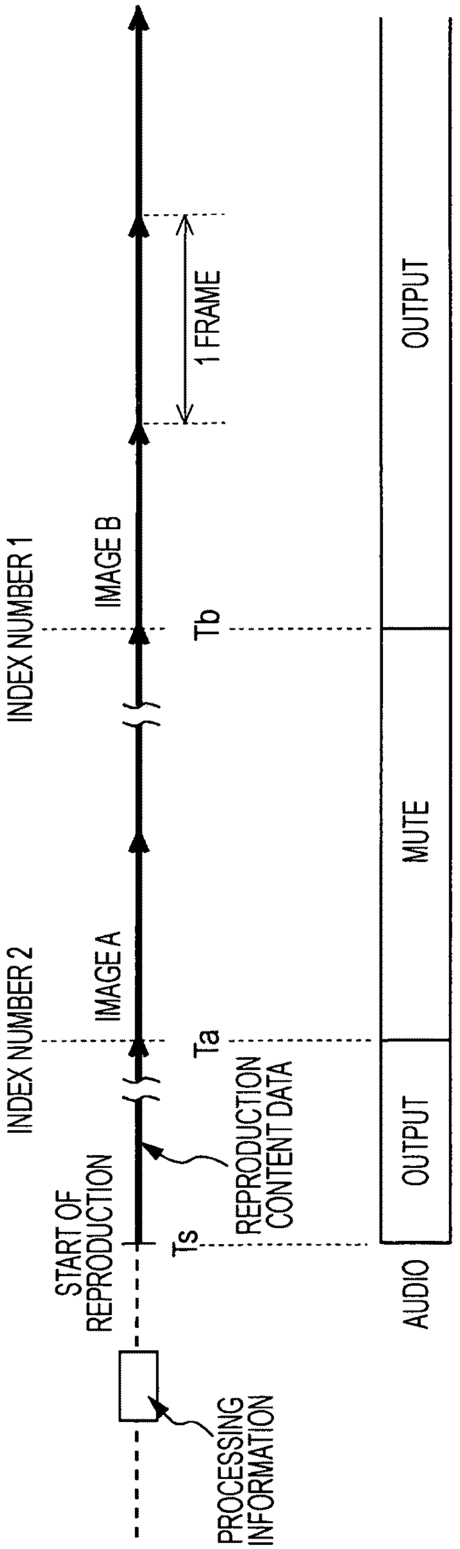
FIG. 25 is a diagram illustrating timings when display processes corresponding to index numbers 1 and 2 are performed in the television receiver.

FIG. 25 shows a timing of muting processing corresponding to the index numbers 1 and 2 performed by the television receiver 300. The processing information is supplied before reproduction of the reproduction content data is started (a time point Ts).

The index number 2 has been added to image data representing the image A. Therefore, the television receiver 300 performs the muting processing corresponding to the index number 2, that is, the muting setting processing, at a timing (time point Ta) when the image data is received so that an audio muting state is entered.

The index number 1 has been added to image data representing the image B. Therefore, the television receiver 300 performs the muting processing corresponding to the index number 1, that is, the muting cancelling processing, at a timing (time point Tb) when the image data is received so that an audio outputting state is entered.

Since the muting setting processing and the muting cancelling processing are performed as shown in FIG. 25, the audio muting state is entered before the audio is changed, and the muting state is cancelled after the audio is changed so that the audio outputting state is entered. Accordingly, pop noise is prevented from being generated when the audio is changed.

Next, another example of muting processing performed by the television receiver 300 will be described. FIG. 26(*a*) shows processing information transmitted from the disc recorder 400 to the television receiver 300 through the bidirectional communication path. Index numbers 1 to 3 are assigned to first to third units of processing, respectively. Note that each of the index numbers 1 and 2 also functions as information representing that the processing information is used to perform muting processing. The processing information corresponding to the index number 1 is "Normal", that is, muting cancelling information. Furthermore, the processing information corresponding to the index number 3 is "Audio Mute", that is, muting setting information. Moreover, the processing information corresponding to the index number 2 is "Audio Mute after X Frames", that is, information representing that muting setting is performed after x frames.

FIG. 26(*b*) shows the timing relationships between index numbers added to content data transmitted from the disc recorder 400 to the television receiver 300 through the TMDS line and displayed images. An index number 3 is added to image data representing an image A which is an image before audio is changed, for example. An index number 1 is added to image data representing an image B which is an image after the audio is changed. An index number 2 is added to image data representing an image C which is an image before the image A by x frames. Note that the images A, B, and C correspond to certain frame images which constitute a moving image.

Figure 27:
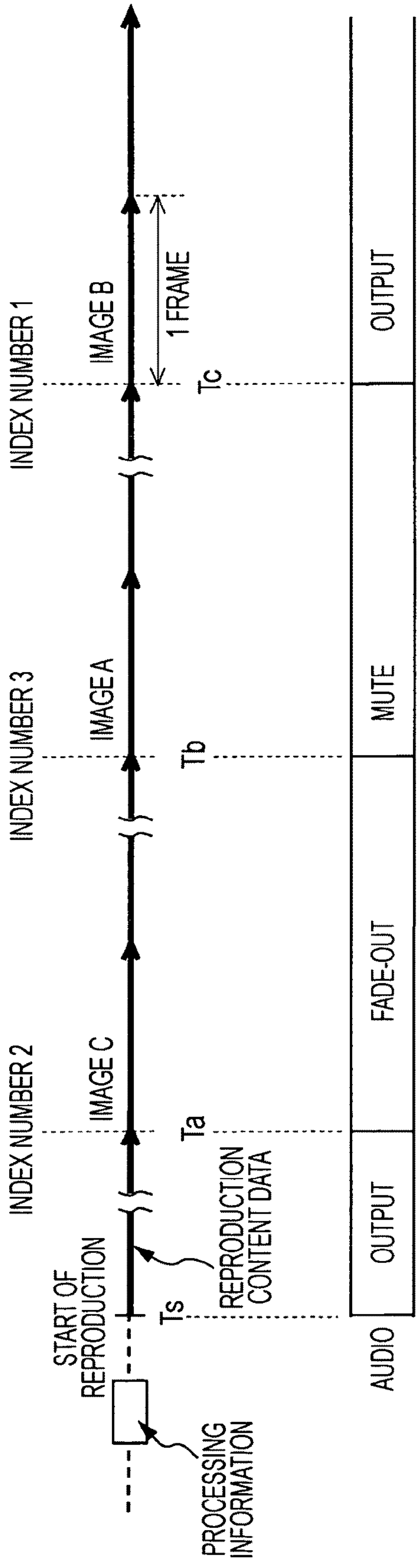
FIG. 27 is a diagram illustrating timings when display processes corresponding to index numbers 1 to 3 are performed in the television receiver.

FIG. 27 shows a timing of muting processing corresponding to the index numbers 1 to 3 performed by the television receiver 300. The processing information is supplied before reproduction of the reproduction content data is started (a time point Ts).

The index number 2 has been added to image data representing the image C. Therefore, the television receiver 300 performs muting processing corresponding to the index number 2, for example, fade-out processing for gradually reducing an output level is performed at a timing when the image data is received (time point Ta), and an audio fade-out state is entered.

Furthermore, the index number 3 has been added to the image data used to display the image A x frames after the image C. Therefore, the television receiver 300 performs muting processing corresponding to the index number 3, that is, muting setting processing, and an audio muting state is entered.

Moreover, the index number 1 has been added to image data used to display the image B. Therefore, the television receiver 300 performs muting processing corresponding to the index number 1, that is, muting cancelling processing at a timing (time point Tc) when the image data is received, and an audio outputting state is entered.

Since the muting setting processing and the muting cancelling processing are performed as shown in FIG. 27, the audio muting state is entered before the audio is changed, and the muting state is cancelled after the audio is changed so that the audio outputting state is entered. Accordingly, pop noise is prevented from being generated when the audio is changed.

Note that according to the processing timings shown in FIG. 27, the index number 3 has been assigned to the image data used to display the image A x frames after the image C. However, the processing information corresponding to the index number 1 which has been added to the image data used to display the image C clearly represents that the muting is set after x frames pass. Therefore, the muting setting can be performed at a timing when the image data representing the image A is displayed without adding the index number 3 to the image data representing the image A.

Transmission of the index numbers 1 to 3 shown in FIG. 26(*a*) can be performed by defining a new InfoFrame packet, for example, as described above (refer to FIG. 11). For example, when the index information is effective, bit[7] of Data Byte1 is set to "1", and at an effective-frame specifying-and-transmitting time, bit[1] of Data Byte1 is set to "1". Furthermore, for example, at the effective-frame specifying-and-transmitting time, the number of frames before an effective state is reached is shown in bit[7:0] of Data Byte2. Then, the index information (index number) is stored in Data Byte3 and after Data Byte 3.

FIG. 28 shows an example of a new InfoFrame. In the InfoFrame packet, since bit[7] of Data Byte1 corresponds to "1", it is recognized that the index information is effective. Furthermore, since bit[1] of Data Byte1 corresponds to "1", the effective-frame specifying-and-transmitting time is recognized. Moreover, it is recognized that the number of frames before an effective state is reached is 16 from bit[7:0] of Data Byte2.

As described above, in the AV system 100A shown in FIG. 22, when the disc recorder 400 performs reproducing processing, reproduction content data (image data and audio data) is transmitted from the disc recorder 400 to the television receiver 300 through the TMDS line included in the HDMI cable 701. Furthermore, in the AV system 100A shown in FIG. 22, processing information used for muting processing performed in synchronization with the reproduction content data is transmitted from the disc recorder 400 to the television receiver 300 through the bidirectional communication path constituted by a reserved line and an HPD line included in the HDMI cable 701 before the reproduction content data is transmitted.

Index information such as an index number is added to the processing information for each unit of processing. Furthermore, index information such as an index number corresponding to the index information added to the processing information is added to the reproduction content data (image data and audio data) at a timing when the processing information is processed for each unit of processing. Then, the television receiver 300 performs muting processing (muting setting processing, muting cancelling processing and the like) corresponding to the index information at a timing when the index information is added to the received content data.

Accordingly, in the AV system 100A shown in FIG. 22, the television receiver 300 can easily perform muting processing in synchronization with reproduction content data (image data and audio data) transmitted from the disc recorder 400. Accordingly, pop noise, for example, is reliably prevented from being generated when the audio is changed.

Figure 29:
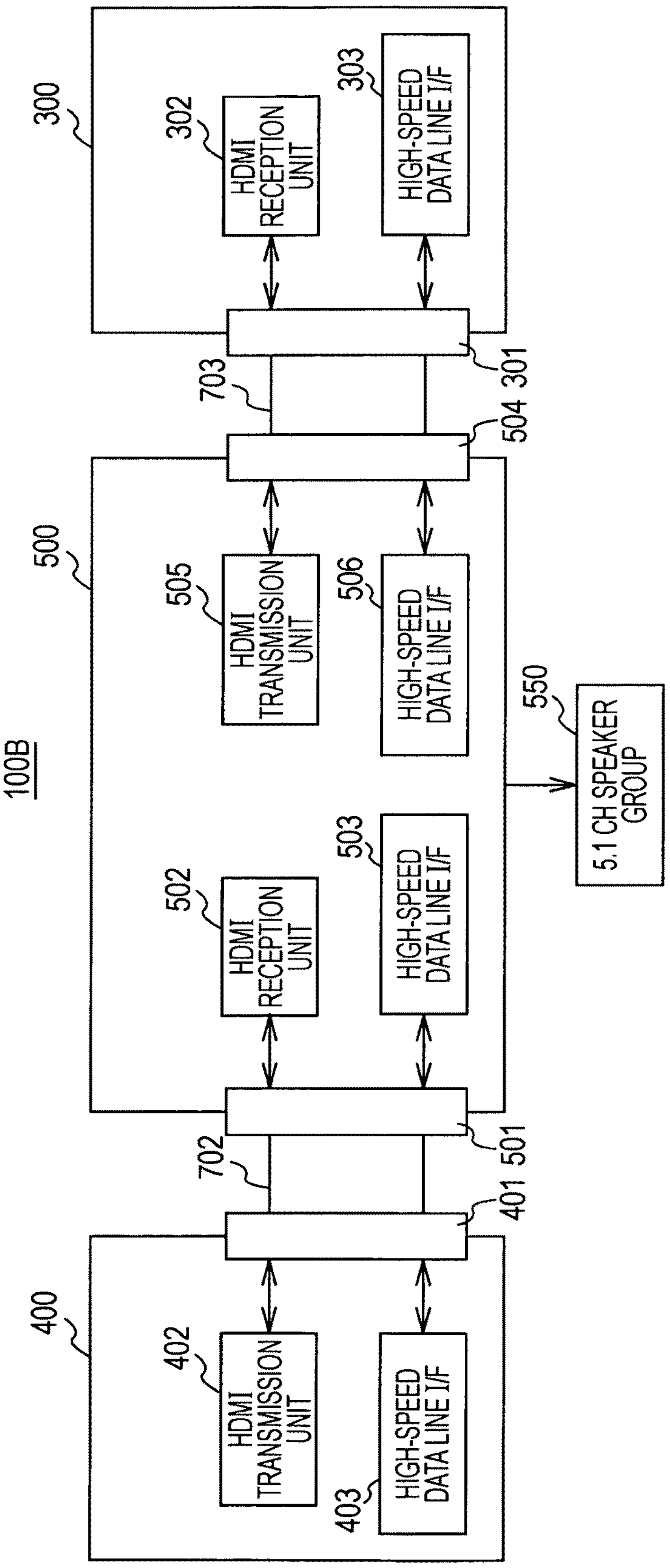
FIG. 29 is a block diagram illustrating a configuration example of an AV system according to still another embodiment of the present invention.

Next, a still another embodiment of the present invention will be described. FIG. 29 shows a configuration example of an AV system 100B according to a still another embodiment. In the AV system 100B, reference numerals the same as those of the AV systems 100 and 100A shown in FIGS. 1 and 22 are assigned to components the same as those of the AV systems 100 and 100A, and descriptions thereof are omitted where appropriate.

The AV system 100B includes a disc recorder 400, an AV amplifier 500, and a television receiver 300. The disc recorder 400 constitutes a source apparatus of an HDMI. The AV amplifier 500 constitutes a repeater apparatus of the HDMI. The television receiver 300 constitutes a sync apparatus of the HDMI.

Since an audio signal reproduced by the disc recorder 400 includes content in association with a multichannel audio, if the television receiver 300 is not capable of decoding the multichannel audio, the AV amplifier 500 serving as a repeater apparatus is connected between the disc recorder 400 and the television receiver 300 as a solution as shown in FIG. 29. The AV amplifier 500 is connected to a speaker group 550. The speaker group 550 includes speakers to be positioned on the front, the right front, the left front, the right back, and the left back of a listener and a subwoofer speaker for low pitch sound to realize a 5.1 channel surround-sound system.

The AV amplifier 500 includes an HDMI reception unit (HDMI RX) 502 and an HDMI terminal 501 connected to a high-speed data line interface 503. Furthermore, the AV amplifier 500 includes an HDMI terminal 504 connected to an HDMI transmission unit (HDMI TX) 505 and a high-speed data line interface 506.

The disc recorder 400 and the AV amplifier 500 are connected to each other through an HDMI cable 702. That is, the HDMI cable 702 is connected to an HDMI terminal 401 of the disc recorder 400 at one terminal thereof, and is connected to the HDMI terminal 501 of the AV amplifier 500 at the other terminal. Furthermore, the AV amplifier 500 and the television receiver 300 are connected to each other through an HDMI cable 703. That is, the HDMI cable 703 is connected to the HDMI terminal 504 of the AV amplifier 500 at one terminal thereof, and is connected to an HDMI terminal 301 of the television receiver 300 at the other terminal.

In the AV system 100B shown in FIG. 29, reproduced content data (image data and audio data) is transmitted from the disc recorder 400 to the television receiver 300 through the AV amplifier 500. The content data is transmitted from an HDMI transmission unit 402 of the disc recorder 400 to the HDMI reception unit 502 of the AV amplifier 500 through a TMDS line included in the HDMI cable 702. Then, the content data is transmitted from the HDMI transmission unit 505 of the AV amplifier 500 to an HDMI reception unit 302 of the television receiver 300 through a TMDS line included in the HDMI cable 703. The television receiver 300 displays an image and outputs audio corresponding to the content data transmitted from the disc recorder 400. Note that the HDMI cables 702 and 703 constitute a first transmission path. The HDMI transmission unit 402 constitutes a data transmission unit. The HDMI reception units 502 and 302 constitute data reception units.

Note that when audio is to be output from the speaker group 550 connected to the AV amplifier 500, in the AV amplifier 500, the audio data received using the HDMI reception unit 502 is processed and supplied to the speaker group 550, and then, the audio is output from the speaker group 550. In this case, the television receiver 300 is brought to an audio muting state.

In the AV system 100B shown in FIG. 29, processing information used to perform processing in synchronization with content data is transmitted from the disc recorder 400 to the AV amplifier 500 and the television receiver 300. The processing information in this embodiment is used to perform audio muting processing and display processing in association with audio output and the like.

The processing information is transmitted from the disc recorder 400 to the AV amplifier 500 and the television receiver 300 through a bidirectional communication path constituted by reserved lines and HPD lines included in the HDMI cables 702 and 703. Note that the bidirectional communication line constitutes a second transmission path. The high-speed data line interface 403 of the disc recorder 400, the high-speed data line interfaces 503 and 506 of the AV amplifier 500, and the high-speed data line interface 303 of the television receiver 300 correspond to interfaces of the bidirectional communication path described above. The high-speed data line interface 403 constitutes an information transmission unit. The high-speed data line interfaces 503 and 303 constitute information reception units.

In the AV system 100B shown in FIG. 29, as described above, the television receiver 300 displays an image corresponding to the image data transmitted from the disc recorder 400. Furthermore, in the AV system 100B shown in FIG. 29, as described above, the television receiver 300 or the AV amplifier 500 outputs audio corresponding to the audio data transmitted from the disc recorder 400.

In the AV system 100B shown in FIG. 29, in accordance with index information added to reproduction content data, audio muting performed by the television receiver 300 and the AV amplifier 500 is controlled. For example, at a timing when certain index information is added, audio muting is set or audio muting is cancelled in accordance with processing information of a unit of processing to which the index information is added.

Furthermore, in the AV system 100B shown in FIG. 29, in accordance with the index information added to the reproduction content data, information on a reproduction method employed in the AV amplifier 500, for example, is superposed on a display image and displayed in the television receiver 300 at an appropriate timing.

Figure 30:
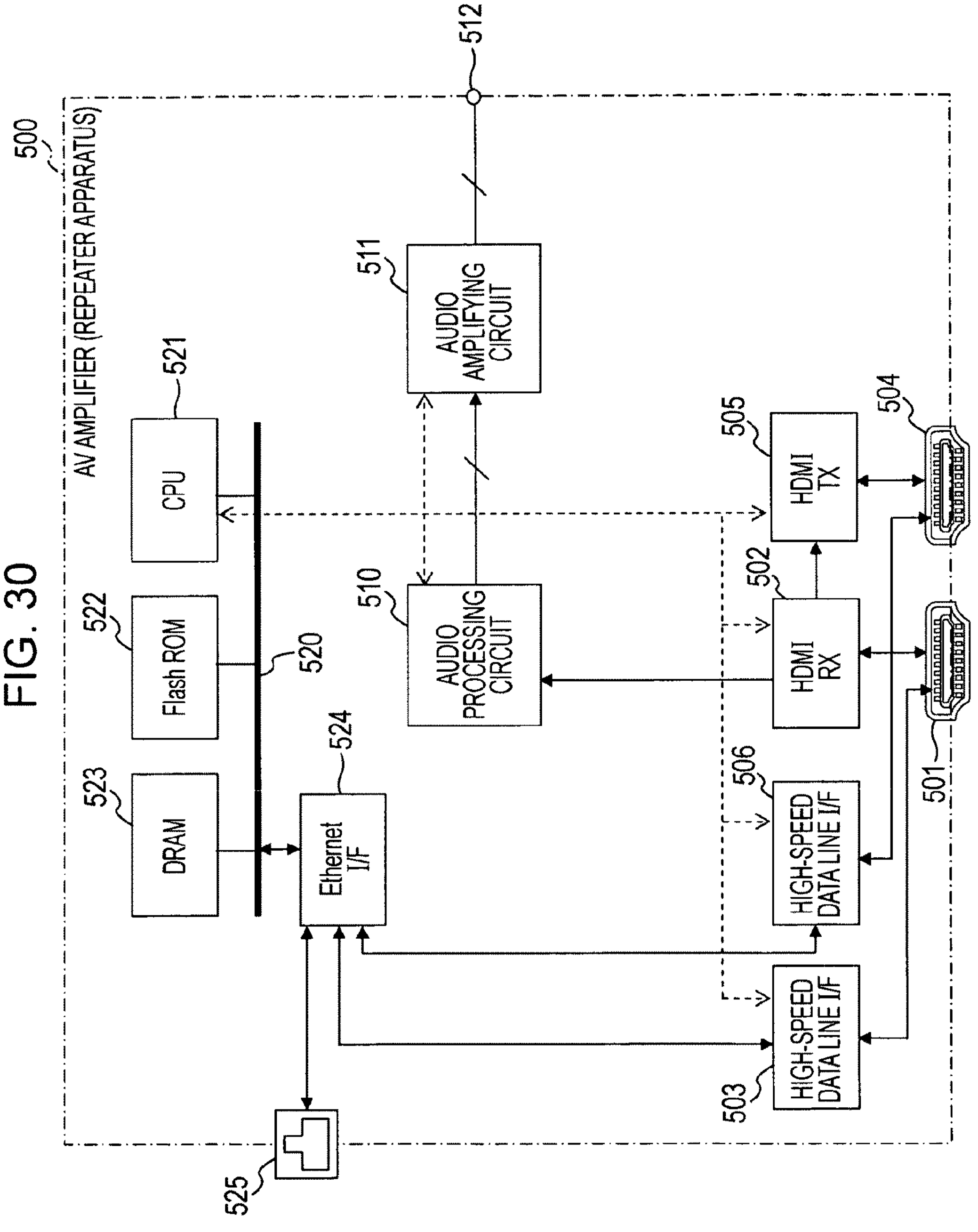
FIG. 30 is a block diagram illustrating a configuration example of an AV amplifier (repeater apparatus) included in the AV system.

FIG. 30 shows a configuration example of the AV amplifier 500. The AV amplifier 500 includes the HDMI terminals 501 and 504, the HDMI reception unit 502, the HDMI transmission unit 505, and the high-speed data line interfaces 503 and 506. The AV amplifier 500 further includes an audio processing circuit 510, an audio amplifying circuit 511, an audio output terminal 512, an internal bus 520, a CPU 521, a flash ROM 522, a DRAM 523, an Ethernet interface 524, and a network terminal 525.

The CPU 521 controls operations of various units of the AV amplifier 500. The flash ROM 522 stores control software and data. The DRAM 523 constitutes a workarea, for example, of the CPU 521. The CPU 521 loads the software and the data read from the flash ROM 522 to the DRAM 523 so as to activate the software, and controls the various units of the AV amplifier 500. The CPU 521, the flash ROM 522, the DRAM 523, and the Ethernet interface 524 are connected to the internal bus 520.

The HDMI reception unit 502 receives video data and audio data in a baseband transmitted as a single-direction communication from an external apparatus (source apparatus) connected to the HDMI terminal 501 through communication complying with an HDMI. The HDMI reception unit 502 supplies audio data to the audio amplifying circuit 511 and supplies image data and audio data to the HDMI transmission unit 505.

The HDMI transmission unit 505 outputs the image data and the audio data in the baseband supplied from the HDMI reception unit 502 from the HDMI terminal 504 through the communication complying with the HDMI. By this, the AV amplifier 500 exercises a repeater function. Although not described in detail, the HDMI reception unit 502 is configured similarly to the HDMI reception unit 302 (refer to FIGS. 3 and 4) of the television receiver 300 described above. Furthermore, although not described in detail, the HDMI transmission unit 505 is configured similarly to the HDMI transmission unit 202 (refer to FIGS. 2 and 4) of the video camera recorder 200 described above.

The audio processing circuit 510 processes the audio data received using the HDMI reception unit 502, and performs processing for generating audio data for each channel in order to realize the 5.1 channel surround-sound system, processing for attaining a predetermined sound-field characteristic, and processing for converting a digital signal into an analog signal, for example. The audio amplifying circuit 511 amplifies audio signals of the channels output from the audio processing circuit 510 and outputs the audio signals to the audio output terminal 512. Note that, although not shown, the front left speaker, the front right speaker, the front center speaker, the rear left speaker, the rear right speaker, and the subwoofer speaker are connected to the audio output terminal 512.

The high-speed data line interfaces 503 and 506 correspond to the interfaces of the bidirectional communication path constituted by the predetermined lines (the reserved lines and the HPD lines in this embodiment) of the HDMI cables connected to the HDMI terminals 501 and 504 as described above. The high-speed data line interfaces 503 and 506 are inserted between the Ethernet interface 524 and the HDMI terminal 501 and between the Ethernet interface 524 and the HDMI terminal 504, respectively. Note that the network terminal 525 is connected to the Ethernet interface 524. Although not described in detail, the high-speed data line interfaces 503 and 506 are configured similarly to the high-speed data line interface 203 (refer to FIGS. 2 and 8) of the video camera recorder 200.

Operation of the AV amplifier 500 shown in FIG. 30 will be described. The HDMI reception unit 502 obtains image data and audio data input in a baseband from the HDMI terminal 501 through the HDMI cable. The image data and the audio data are supplied to the HDMI transmission unit 505 and output to the HDMI cable connected to the HDMI terminal 504.

Furthermore, the audio data received using the HDMI reception unit 502 is supplied to the audio processing circuit 510. The audio processing circuit 510 performs processing for generating audio data for each channel in order to realize the 5.1 channel surround-sound system, processing for attaining a predetermined sound-field characteristic, and processing for converting a digital signal into an analog signal, for example, on the audio data. Audio signals of the respective channels output from the audio processing circuit 510 are supplied to the audio output terminal 512 through the audio amplifying circuit 511.

Note that, in the AV system 100B shown in FIG. 29, when audio corresponding to audio data supplied from the disc recorder 400 is to be output from a speaker of the television receiver 200, the audio amplifying circuit 521 is controlled by the CPU 321 so that a muting state is entered. Conversely, in the AV system 100B shown in FIG. 29, when audio is to be output from the AV amplifier 500, the television receiver 200 is brought to an audio muting state.

In the AV system 100B shown in FIG. 29, when the disc recorder 400 (refer to FIG. 23) performs reproducing processing, content data (image data and audio data) reproduced using a DVD/BD drive 414 or an HDD 415 is supplied from a MPEG decoder 416 to the HDMI transmission unit 402. Then, the content data is supplied from the HDMI transmission unit 402 to the HDMI reception unit 502 of the AV amplifier 500 through the TMDS line included in the HDMI cable 702. Furthermore, the content data is supplied from the HDMI transmission unit 505 of the AV amplifier 500 to the HDMI reception unit 302 of the television receiver 300 through the TMDS line included in the HDMI cable 703.

In the television receiver 300 (refer to FIG. 3), video data received using the HDMI reception unit 302 is supplied to a video/graphic processing circuit 314. Furthermore, the audio data received using the HDMI reception unit 302 is supplied to an audio processing circuit 317. By this, an image reproduced from the disc recorder 400 is displayed on a display panel 316, and audio reproduced from the disc recorder 400 is output from the speaker 319.

Furthermore, in the AV system 100B shown in FIG. 29, the disc recorder 400 transmits processing information used to perform audio muting processing performed in synchronization with the reproduction content data and display processing to the television receiver 300 through the AV amplifier 500. In the disc recorder 400 (refer to FIG. 23), the processing information is supplied from a CPU 421 to the high-speed data line interface 403 through an Ethernet interface 424.

Then, the processing information is supplied from the high-speed data line interface 403 to the high-speed data line interface 503 of the AV amplifier 500 through the bidirectional communication path included in the HDMI cable 702. Furthermore, the processing information is transmitted from the high-speed data line interface 506 of the AV amplifier 500 to the high-speed data line interface 303 of the television receiver 300 through the bidirectional communication path included in the HDMI cable 703.

Transmission from the disc recorder 400 to the television receiver 300 is performed, for example, before the reproduction content data described above is transmitted from the disc recorder 400 to the television receiver 300. In the television receiver 300, the processing information received using the high-speed data line interface 303 is supplied to a CPU 331 through an Ethernet interface 336, and stored in a DRAM 333, for example. As described above, index information such as an index number is added to the processing information for a unit of processing.

On the other hand, index information such as an index number corresponding to the index information added to the processing information has been assigned to the content data (image data and audio data) received using the HDMI reception unit 302 at a timing when the processing information is processed for each unit of processing. The index information added to the content data is extracted using the HDMI reception unit 302 and supplied to the CPU 331.

When the index information is supplied from the HDMI reception unit 302, the CPU 331 obtains processing information for a predetermined unit of processing corresponding to the index information from the processing information stored in the DRAM 333. Then, the CPU 331 performs a processing operation such as audio muting or display processing in accordance with the obtained processing information. For example, when the processing information represents "Mute", the CPU 331 controls the audio amplifying circuit 318 so that a muting state is entered. Furthermore, when the processing information represents "None", the CPU 331 controls the audio amplifying circuit 318 so that the muting state is cancelled. Moreover, when the processing information is to be used for the display processing, the CPU 331 performs display in association with audio output and the like while an image is displayed.

Next, an example of the muting processing performed by the television receiver 300 will be described. FIG. 31(*a*) shows processing information transmitted from the disc recorder 400 to the AV amplifier 500 and the television receiver 300 through the bidirectional communication path. Index numbers 1 to 3 are assigned to first to third units of processing, respectively.

Note that each of the index numbers 1 and 2 is also information representing that corresponding processing information is used to perform muting processing. The processing information corresponding to the index number 1 is "None", that is, muting cancelling information. Furthermore, the processing information corresponding to the index number 2 is "Mute", that is, muting setting information. Moreover, the index numbers 3 is also information representing that corresponding processing information is used to perform display processing. The processing information corresponding to the index number 3 represents display content "AV Amp active & Dolby 5.1 ch reproduction" in the display processing corresponding to the index number 3.

FIG. 31(*b*) shows the timing relationships between index numbers added to content data transmitted from the disc recorder 400 to the television receiver 300 through the TMDS line and displayed images. Index numbers 2, 3, and 1 are added to image data representing an image A, image data representing an image B, and image data representing an image C, respectively. Note that the images A to C correspond to certain frame images which constitute a moving image.

Figure 32:
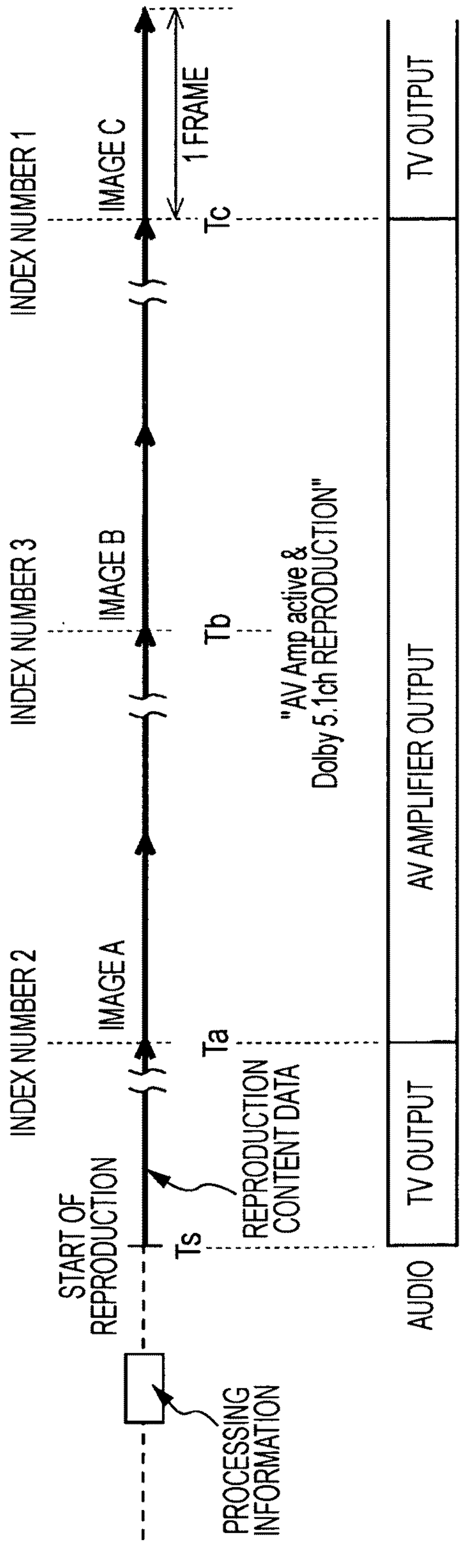
FIG. 32 is a diagram illustrating timings when display processes corresponding to index numbers 1 to 3 are performed in the television receiver.

FIG. 32 shows a timing of muting processing and display processing corresponding to the index numbers 1 to 3 performed by the television receiver 300. The processing information is supplied before reproduction of the reproduction content data is started (a time point Ts).

The index number 2 has been added to the image data representing the image A. Therefore, the television receiver 300 performs the muting processing corresponding to the index number 2, that is, the muting setting processing, at a timing (time point Ta) when the image data is received so as to enter an audio muting state. In this case, the audio output is switched from the television output to AV amplifier output. Note that, although not described in detail, in the AV amplifier 500, the muting processing, that is, the muting cancelling processing is performed in accordance with the index number 2 so that an audio output state is entered.

Furthermore, the index number 3 has been added to image data representing the image B. Therefore, in the television receiver 300, display processing corresponding to the index number 3, that is, display of "AV Amp active & Dolby 5.1 ch reproduction" representing a reproducing method of the AV amplifier 500 is superposed on the displayed image at a timing when the image data is received (a time point Tb).

Furthermore, the index number 1 has been added to image data representing the image C. Therefore, in the television receiver 300, muting processing, that is, muting cancelling processing is performed in accordance with the index number 1 at a timing when the image data is received (a time point Tc) so that an audio output state is entered. In this case, the display of "AV Amp active & Dolby 5.1 ch reproduction" is deleted. Furthermore, in this case, the audio output is switched from the AV amplifier output to the television output. Note that, although not described in detail, in the AV amplifier 500, muting processing, that is, muting setting processing is performed in accordance with the index number 1 so that an audio muting state is entered.

As described above, in the AV system 100B shown in FIG. 29, when the disc recorder 400 performs reproducing processing, reproduction content data (image data and audio data) is transmitted from the disc recorder 400 to the television receiver 300 through the AV amplifier 500 using the TMDS lines included in the HDMI cables 702 and 703. Furthermore, in the AV system 100B shown in FIG. 29, processing information used to perform muting processing and display processing in synchronization with the reproduction content data is transmitted from the disc recorder 400 to the television receiver 300 through the AV amplifier 500 using the bidirectional communication path constituted by the reserved lines and the HPD lines included in the HDMI cables 702 and 703 before the reproduction content data is transmitted.

Index information such as an index number is added to processing information for each unit of processing. Furthermore, index information such as an index number corresponding to the index information added to the processing information is added to the reproduction content data (image data and audio data) at a timing when the processing information is processed for each unit of processing. Then, in the television receiver 300 and the AV amplifier 500, at a timing when the index information is added to the received content data, muting processing and display processing corresponding to the index information is performed.

Accordingly, in the AV system 100B shown in FIG. 29, in the television receiver 300 and the AV amplifier 500, muting processing and display processing can be easily performed in synchronization with the reproduction content data (image data and audio data) transmitted from the disc recorder 400.

Note that, in the foregoing embodiments, the processing information is transmitted from the video camera recorder 200 or the disc recorder 400 to the television receiver 300 and the like through the bidirectional communication path in advance before the content data is reproduced. However, the processing information may be transmitted any time, and content thereof may be updated.

Furthermore, in the foregoing embodiments, the processing information used to perform the display processing and the processing information used to perform the muting processing have been described. However, the processing information may be used to perform another processing in synchronization with content data, and examples of such processing information will be described below.

(1) Supplement of HDMI Specification in Association with Synchronization

In an HDMI 422 transmission, transmission of 8/10/12 bits can be performed. However, a word size cannot be displayed. Since a process to be performed in a circuit in a subsequent stage may depend on a signal word size, by transmitting a transmission word size in the HDMI 422 transmission as processing information transmitted through a bidirectional communication path, processing suitable for the word size can be performed.

(2) Correction of HDMI Function in Association with Synchronization

In the HDMI, although InfoFrame is defined, only AVI and InfoFrame of Audio are required, and other InfoFrames may not be transmitted due to system restriction, for example. Therefore, when the transmission cannot be performed due to device restriction and the like of and HDMI transmission unit or an HDMI reception unit, InfoFrames other than required InfoFrames may be transmitted as processing information.

Furthermore, in the foregoing embodiment, the case where the source apparatus corresponds to the video camera recorder 200 and the disc recorder 400, the sync apparatus corresponds to the television receiver 300, and the repeater apparatus corresponds to the AV amplifier 500 is described as an example. However, a range to which the present invention is applicable is not limited to these apparatuses. The present invention is similarly applicable to other AV systems constituted by apparatuses similar to these apparatuses.

Furthermore, in the foregoing embodiments, the apparatuses correspond to e-HDMI compliant apparatuses, and transmit processing information from the video camera recorder 200 or the disc recorder 400 to the television receiver 300 and the AV amplifier 500 using the bidirectional communication path included in the HDMI cables. However, the present invention is applicable to e-HDMI noncompliant apparatuses. In this case, processing information is transmitted by connecting another apparatus through another digital interface. For example, processing information may be transmitted through Ethernet by connecting the apparatuses to one another through network terminals. Furthermore, although a communication speed is low, processing information may be transmitted through a CEC line.

Moreover, it is assumed that the interfaces complying with the HDMI are used as the transmission paths used to connect the apparatuses in the foregoing embodiments. However, the interfaces may comply with other similar transmission standards. Furthermore, in the foregoing embodiments, the apparatuses are connected to the HDMI cables. However, the present invention is similarly applicable to a case where electronic apparatuses are connected to one another through wireless communication.

INDUSTRIAL APPLICABILITY

According to the present invention, certain processing can be easily performed on a reception side in synchronization with content data. The present invention is applicable to, for example, an AV system in which a source apparatus and a sync apparatus are connected to each other and an AV system in which a source apparatus and a sync apparatus are connected to each other through a repeater apparatus.

The invention claimed is:

1. A transmission apparatus, comprising:

a processor operable as:

a data transmission unit to cause a transmitter to transmit content data through a first transmission path to an external apparatus, and an information transmission unit to cause the transmitter to transmit processing information used to perform processing in synchronization with the content data through a second transmission path to the external apparatus, wherein the second transmission path corresponds to a bidirectional communication path including a certain line of the first transmission path, the bidirectional communication path corresponds to a pair of differential transmission paths, and at least one of the pair of differential transmission paths has a function of transmitting a connection state of the external apparatus using a direct current bias potential, first index information is added to the processing information of each unit of processing transmitted from the information transmission unit such that processing associated with a respective piece of first index information corresponding to the processing information of a specific unit of processing is carried out by the external apparatus at a time at which the external apparatus performs the processing of a particular piece of the content data that is synchronized with the specific unit of processing, and second index information is added to the content data currently being transmitted from the data transmission unit which represents the first index information corresponding to the content data that was previously transmitted from the data transmission unit or that is to be subsequently transmitted from the data transmission unit and thereby predicts the processing that is to be performed in accordance with the processing information of each unit of processing that is synchronized with that previously transmitted or subsequently transmitted content data.

2. The transmission apparatus according to claim 1, wherein the processor operable as the data transmission unit causes the transmitter to transmit the content data in a plurality of channels through the first transmission path to the external apparatus using differential signals.

3. The transmission apparatus according to claim 1, wherein the processor operable as the information transmission unit causes the transmitter to transmit the processing information through the bidirectional communication path to the external apparatus.

4. The transmission apparatus according to claim 1, wherein the content data transmitted by the transmitter from the data transmission unit includes image data, and the processing information transmitted by the transmitter from the information transmission unit is used to display the identifying information superposed on an image corresponding to the image data.

5. The transmission apparatus according to claim 1, wherein the content data transmitted by the transmitter from the data transmission unit includes audio data, and the processing information transmitted by the transmitter from the information transmission unit is used to control output of audio corresponding to the audio data.

6. An information transmission method for execution by a processor, the method comprising:

transmitting, to an external apparatus through a first transmission path, processing information which is used to perform processing in synchronization with content data and to which first index information is added to the processing information of each unit of processing such that processing associated with a respective piece of first index information corresponding to the processing information of a specific unit of processing is carried out by the external apparatus at a time at which the external apparatus performs processing of a particular piece of the content data that is synchronized with the specific unit of processing; and transmitting, to the external apparatus through a second transmission path, the content data currently being transmitted to which is added second index information which represents the first index information corresponding to the content data that was previously transmitted to the external apparatus or that is to be subsequently transmitted to the external apparatus and thereby predicts processing that is to be performed in accordance with the processing information of each unit of processing that is synchronized with that previously transmitted or subsequently transmitted content data, wherein the first transmission path corresponds to a bidirectional communication path including a certain line of the second transmission path, the bidirectional communication path corresponds to a pair of differential transmission paths, and at least one of the pair of differential transmission paths has a function of transmitting a connection state of the external apparatus using a direct current bias potential.

7. A reception apparatus, comprising:

a processor operable as:

an information reception unit is to cause a receiver to receive, through a first transmission path from an external apparatus, processing information which is used to perform processing in synchronization with content data and to which first index information is added to the processing information of each unit of processing such that processing associated with a respective piece of first index information corresponding to the processing information of a specific unit of processing is carried out at a time at which processing of a particular piece of the content data that is synchronized with the specific unit of processing is performed, a data reception unit to cause the receiver to receive, is added through a second transmission path from the external apparatus, the content data to which second index information which represents the first index information corresponding to the content data that was previously received by the data reception unit or that is to be subsequently received by the data reception unit and thereby predicts the processing that is to be performed in accordance the processing information of each unit of processing that is synchronized with that previously received or subsequently received content data, and an information processing unit to process the processing information of each unit of processing received at the receiver using the information reception unit in accordance with the first and second index information, wherein the first transmission path corresponds to a bidirectional communication path including a certain line of the second transmission path, the bidirectional communication path corresponds to a pair of differential transmission paths, and at least one of the pair of differential transmission paths has a function of transmitting a connection state of the external apparatus using a direct current bias potential.

8. The reception apparatus according to claim 7, wherein the processor operable as the data reception unit causes the receiver to receive the content data in a plurality of channels through the first transmission path from the external apparatus using differential signals.

9. The reception apparatus according to claim 7, wherein the processor operable as the information reception unit causes the receiver to receive the processing information from the external apparatus through the bidirectional communication path.

10. The reception apparatus according to claim 7, wherein the processor is further operable as a transmitter, the content data received by the receiver includes image data, and the processing information transmitted from the transmitter when the information reception unit displays the identifying information superposed on an image corresponding to the image data.

11. The reception apparatus according to claim 7, wherein the processor is further operable as a transmitter, the content data received by the receiver when the data reception unit is executed by the processor includes audio data, and the processing information transmitted from the transmitter when the information reception unit controls output of audio corresponding to the audio data.

12. An information processing method for execution by a processor, the method comprising:

receiving, from an external apparatus through a first transmission path, processing information which is used to perform processing in synchronization with content data and to which first index information is added to the processing information of each unit of processing such that processing associated with a respective piece of first index information corresponding to the processing information of a specific unit of processing is carried out at a time at the processing of a particular piece of the content data that is synchronized with the specific unit of processing is performed, receiving, from the external apparatus through a second transmission path, the content data to which is added second index information which represents the first index information corresponding to the content data that was previously received from the external apparatus or that is to be subsequently received from the external apparatus and thereby predicts the processing that is to be performed in accordance with the processing information of each unit of processing that is synchronized with that previously received or subsequently received content data; and performing the processing corresponding to the processing information of each unit of processing received in the information reception step in accordance with the first and second index information, wherein the first transmission path corresponds to a bidirectional communication path including a certain line of the second transmission path, the bidirectional communication path corresponds to a pair of differential transmission paths, and at least one of the pair of differential transmission paths has a function of transmitting a connection state of the external apparatus using a direct current bias potential.

* * * * *